United States Patent [19]
Kabasawa

[11] Patent Number: 6,118,619
[45] Date of Patent: Sep. 12, 2000

[54] RECORDING-MEDIUM CARTRIDGE LOADING DEVICE

[75] Inventor: Hidetoshi Kabasawa, Saitama-Ken, Japan

[73] Assignee: Teac Corporation, Tokyo, Japan

[21] Appl. No.: 09/173,330

[22] Filed: Oct. 15, 1998

[30] Foreign Application Priority Data

Oct. 31, 1997 [JP] Japan ................................. 9-300543

[51] Int. Cl.$^7$ .................................................. G11B 17/02
[52] U.S. Cl. ......................................................... 360/99.06
[58] Field of Search ........................... 360/99.02, 99.03, 360/99.06, 99.07, 96.5, 96.6

[56] References Cited

U.S. PATENT DOCUMENTS 5,063,554  11/1991  Uehara .................................. 360/99.06

FOREIGN PATENT DOCUMENTS 7-26944  5/1995  Japan .
9-44958  2/1997  Japan .

*Primary Examiner*—Robert S. Tupper
*Attorney, Agent, or Firm*—Ladas & Parry

[57] ABSTRACT

A cartridge inserting path is provided, into which a recording-medium cartridge containing a recording medium and having a cut-off portion at a front end can be inserted. An erroneous-insertion preventing mechanism is provided. The erroneous-insertion preventing mechanism includes a fitting portion which is located approximately in a middle of the cartridge inserting path and is fitted into the cut-off portion of the recording-medium cartridge, and a contacting portion which is located approximately in a middle of the cartridge inserting path and comes into contact with the front end of the recording-medium cartridge. When the recording-medium cartridge is inserted in an erroneous orientation, the fitting portion comes into contact with the front end of the recording-medium cartridge, and, thus, prevents further insertion of the recording-medium cartridge. When the recording-medium cartridge is inserted in a correct orientation, the fitting portion is fitted into the cut-off portion of the recording-medium cartridge, and the contacting portion is pushed by the front end of the recording-medium cartridge and moves in a direction such that further insertion of the recording-medium cartridge is enabled.

14 Claims, 19 Drawing Sheets

CARTRIDGE INSERTING DIRECTION ( X-X SECTION )

RECORDING-MEDIUM CARTRIDGE LOADING DEVICE

BACKGROUND OF THE INVENTION

1. Field of the Invention

The present invention relates to a recording-medium cartridge loading device, and, in particular, to a recording-medium cartridge loading device which has an arrangement such that a loading operation of a recording-medium cartridge is performed only when the recording-medium cartridge containing a recording medium is inserted in the correct orientation.

2. Description of the Related Art

For example, an electronic apparatus, such as a personal computer, a word processor or the like, is equipped with a magnetic disk device as means for recording information. In the magnetic disk device, when a disk cartridge (recording-medium cartridge) containing a magnetic disk as a recording medium is loaded, the magnetic disk contained in the disk cartridge is driven and rotated, and, also, magnetic heads slide on the magnetic disk so that magnetic recording and reproducing are performed.

Further, in the magnetic disk device, a head carriage which supports the magnetic heads moves in a radial direction of the magnetic disk along a guiding shaft so that the magnetic heads are caused to slide on an arbitrary recording track of the magnetic disk, and magnetic recording or reproducing is performed.

Further, in the magnetic disk device, as a result of disk rotation speed being increased, the recording medium is made to have a high density, and the storage capacity of the magnetic disk is increased. In such a kind of large-capacity magnetic disk device, because a floating force occurring due to air flow resulting from high-speed rotation of the magnetic disk is applied to the magnetic heads, the magnetic recording and reproducing can be performed in a condition in which the magnetic heads slightly float from the surfaces of the magnetic disk.

There are a plurality of types of disk cartridges which have different storage capacities. Corresponding to storage capacities of disk recording media, a double-sided double-density double-track disk (generally called '2DD') and a double-sided high-density double-track disk (generally called '2HD') have been standardized.

Further, recently, a disk recording medium having a storage capacity larger than the 1.44-MB storage capacity of the 2HD has been developed. For example, there is a disk cartridge (generally called 'HiFD') having a storage capacity of 240 MB in an unformatted condition and having a storage capacity of 200 MB in a formatted condition.

The conventionally used low-capacity cartridge (2DD or 2HD), and the high-capacity cartridge (HiFD), having the large storage capacity, are formed to have respective dimensions approximately identical and have respective outer shapes approximately identical, so as to be compatible. There is a magnetic disk device which can perform magnetic recording or reproducing when any type of cartridge, i.e., the low-capacity cartridge (2DD or 2HD) or the high-capacity cartridge (HiFD), is inserted.

In a conventional magnetic disk device widely used in a personal computer or the like, any of the low-capacity cartridges, i.e., 2DD and 2HD, can be loaded. However, because formats of the magnetic disks 2DD and 2HD are different, the magnetic disk device should determine whether a loaded disk cartridge is 2DD or 2HD. For this purpose, a detecting switch for detecting 2DD is provided in the magnetic disk device. When this detecting switch is in an ON condition, it is determined that the loaded disk cartridge is 2DD. When the detecting switch is in an OFF condition, it is determined that the loaded disk cartridge is 2HD.

In a magnetic disk device in which the high-capacity cartridge is loaded, the low-capacity cartridge can also be loaded.

As described above, these disk cartridges have different storage capacities but have approximately identical outer shapes and approximately identical dimensions of respective portions. However, because the storage capacity of the magnetic disk of the high-capacity cartridge is larger than that of the magnetic disk of the low-capacity cartridge, the rotation speed of the magnetic disk of the high-capacity cartridge is higher than that of the magnetic disk of the low-capacity cartridge, for example, and also, the magnetic heads and the head carriage are designed differently for the HiFD.

FIG. 1 shows a perspective view indicating the shape of the 2HD cartridge.

The 2HD cartridge 100 contains a magnetic disk. As shown in FIG. 1, a shutter 102 for uncovering and covering an opening 101 through which the magnetic heads (not shown in the figure) approach the disk is slideably provided at the front end in the inserting direction of the cartridge 100.

At the corner at the right side of the front end of the cartridge 100, a cut-off portion 103, which is inclined at 45° with respect to the inserting direction, is provided. This cut-off portion 103 engages with an erroneous-insertion preventing mechanism provided in a below-described recording-medium cartridge loading device (hereinafter, referred to as a 'loading device') and causes this mechanism to enable a cartridge inserting operation.

That is, when the inserting direction of the cartridge 100 is erroneous, because the cut-off portion 103 is located at a position such as not to engage with the erroneous-insertion preventing mechanism, insertion of the cartridge is prevented. At the rear side of the cartridge 100, a write protect 100a for inhibiting writing and an opening 100b for identifying that this cartridge is a 2HD cartridge are provided.

The 2DD cartridge has dimensions the same as the dimensions of the above-described 2HD cartridge 100 and a shape the same as the shape of the above-described 2HD cartridge 100 except that the opening 100b for 2HD identification is not provided in the 2DD cartridge.

FIG. 2 shows a perspective view indicating the shape of the HiFD cartridge.

The HiFD cartridge 105 has dimensions the same as those of the 2HD cartridge 100 and a shape approximately the same as the shape of the 2HD cartridge 100. As shown in FIG. 2, a shutter 107 for uncovering and covering an opening 106 through which the magnetic heads (not shown in the figure) approach the disk is slideably provided at the front end in the inserting direction of the cartridge 105.

Further, at the front end in the inserting direction, a cut-off portion 108 having a shape of a groove extending in the inserting direction is provided. This cut-off portion 108 is different from the cut-off portion 103 of the above-described 2HD cartridge 100. Therefore, in a loading device designed specifically for 2DD or 2HD, the HiFD cartridge 105 cannot be loaded.

A loading device, in which any of the 2HD cartridge 100, the 2DD cartridge and the HiFD cartridge 105 can be loaded, has an arrangement such that erroneous insertion of the cartridge 100 or 105 can be prevented as a result of any one of the cut-off portion 103 and the cut-off portion 108 being detected. In the HiFD cartridge 105, an opening 105a, a write protect 105b for inhibiting writing and an opening 105c for identifying that this cartridge is an HiFD cartridge are provided.

The loading device in which any one of the 2DD, 2HD and HiFD cartridges can be loaded will now be described.

FIG. 3 shows a plan view of a magnetic disk device in which any one of the 2DD, 2HD and HiFD cartridges can be loaded.

As shown in FIG. 3, in the magnetic disk device 110, a loading device 111 in which any one of the three types of disk cartridges, i.e., 2DD, 2HD and HiFD, (not shown in the figure) can be loaded is provided above a chassis 112. The loading device 111 has a disk holder 113 in which the disk cartridge (not shown in the figure) is inserted.

Further, at the front surface of the chassis 112, a bezel 115 having a disk inserting hole and an ejecting button 114 is mounted. Further, below the disk holder 113, a slider 116 which lifts and lowers the disk holder 113 while performing a sliding operation is provided.

The disk holder 113 has disk insertion guides 113a and 113b which are formed so as to define a space in which the disk cartridge is inserted. An insertion position of the disk cartridge 100 or 105 is guided as a result of the both sides of the cartridge sliding on the disk insertion guides 113a and 113b, respectively.

At a rear portion of a top plate of the disk holder 113, an erroneous-insertion preventing mechanism 130 is provided. The erroneous-insertion preventing mechanism 130 includes a lever 132, which is rotatably supported by a shaft 131 which stands at a rear portion of the top plate of the disk holder 113, and a coil spring 133 which applies force to the lever clockwise. The lever 132 is provided with an engagement portion 134 which engages with the cut-off portion 103 or 108 of the cartridge 100 or 105, the engagement portion 134 being bent downward.

At the center of the rear portion of the disk holder 113, a head carriage 117 which supports magnetic heads, and a carriage driving mechanism 118 which drives the head carriage 117 are provided. The carriage driving mechanism 118 includes a guiding shaft 119 which guides the head carriage 117, a leading screw 120, and a carriage driving motor 121 which rotates the leading screw 120 and thus moves the head carriage 117.

At the right side of the rear portion of the disk holder 113, a latch lever 122 is rotatably provided. The latch lever 122 engages with and prevents movement of a slider (not shown in the figure) when the disk cartridge is ejected, and pushes the disk cartridge 100 or 105, inserted in the disk holder 113, in the ejecting direction when an ejection operation is performed. That is, the latch lever 122 is mounted on the chassis 112 and can rotate about a rotation shaft 122a, and has a force applied thereto in the ejecting direction (counterclockwise) by a torsion spring (not shown in the figure). The latch lever 122 stops engagement with and prevents movement of the slider as a result of insertion of the disk cartridge.

The ejecting button 114 is coupled to the front end of the slider and, when the ejecting button 114 is pushed, the slider slides to a position at which the slider stops engagement with and prevents movement of the latch lever 122. Thereby, the latch lever 122 pushes the disk cartridge and the disk cartridge 100 or 105 is ejected through the disk inserting hole of the bezel 115.

On the chassis 112, a turntable 124 and a disk motor 125 are provided. The turntable 124 drives and rotates the magnetic disk of the disk cartridge 100 or 105, which has been held at a loading position through falling of the disk holder 113. The disk motor 125 drives and rotates the turntable 124.

The above-mentioned erroneous-insertion preventing mechanism 130 has an arrangement such that the engagement portion 134 of the lever 132 provided at the rear portion of the top plate of the disk holder 113 engages the cut-off portion 103 or 108 of the cartridge 100 or 105, and, thus, insertion of the cartridge 100 or 105 is enabled.

FIGS. 4A, 4B and 4C illustrate an operation of the erroneous-insertion preventing mechanism 130.

When, as shown in FIG. 4A, the high-capacity (HiFD) cartridge 105 is inserted in a condition where the top and the bottom of the cartridge are inverted, the cut-off portion 108 cannot engage with the engagement portion 134, and the front end in the inserting direction of the high-capacity cartridge 105 comes into contact with an end of the engagement portion 134. Thereby, the high-capacity cartridge 105 cannot be inserted, and, thus, erroneous insertion is prevented.

When, as shown in FIG. 4B, the high-capacity cartridge 105 is inserted in the correct orientation, the engagement portion 134 is fitted into the groove of the cut-off portion 108, and, thereby, insertion of the high-capacity cartridge 105 is enabled. As a result, the high-capacity cartridge 105 is loaded in a predetermined loading position.

When, as shown in FIG. 4C, the low-capacity (2HD) cartridge 100 is inserted in the correct orientation, the engagement portion 134 engages with the inclined surface of the cut-off portion 103, and the lever 132 rotates counterclockwise. Thus, the engagement portion 134 retreats from the path through which the low-capacity (2HD) cartridge 100 is inserted. Thereby, insertion of the low-capacity cartridge 100 is enabled. As a result, the low-capacity cartridge 100 is loaded in the predetermined loading position.

However, because the lever 132 of the erroneous-insertion preventing mechanism 130 is provided at the top plate of the rear portion of the disk holder 113, when the low-capacity cartridge 100 or the high-capacity cartridge 105 is inserted into the disk holder 113 in an erroneous orientation, the end of the engagement portion 134 comes into contact with the insertion-side end of the cartridge, after the cartridge 100 or 105 is inserted to a stage immediately before the insertion into the disk holder 113 is finished, and, then, insertion of the cartridge 100 or 105 is prevented.

Therefore, whether or not the orientation of the cartridge 100 or 105 is correct cannot be determined until the cartridge 100 or 105 is almost completely inserted into the disk holder 113. Thus, it is not possible to determine the orientation of the cartridge 100 or 105 in an initial stage of insertion of the cartridge.

Further, in the magnetic disk device in the related art, as shown in FIG. 3, the latch lever 122 provided on the chassis 112 and the erroneous-insertion preventing mechanism 130 provided at the top plate of the disk holder 113 are located at the same position on the plan view. Because the latch lever 122 and the erroneous-insertion preventing mechanism 130 thus overlap each other on the plan view via the disk holder 113, it is difficult to reduce the thickness of the device.

SUMMARY OF THE INVENTION

An object of the present invention is to provide a recording-medium cartridge loading device in which the above-mentioned problems are solved.

The present invention is a recording-medium cartridge loading device, comprising:

a cartridge inserting path, into which a recording-medium cartridge containing a recording medium and having a cut-off portion at a front end can be inserted; and an erroneous-insertion preventing mechanism, wherein the erroneous-insertion preventing mechanism comprises:

a fitting portion which is located approximately in the middle of the cartridge inserting path and is fitted into the cut-off portion of the recording-medium cartridge; and a contacting portion which is located approximately in the middle of the cartridge inserting path and comes into contact with the front end of the recording-medium cartridge, and wherein:

when the recording-medium cartridge is inserted in an erroneous orientation, the fitting portion comes into contact with the front end of the recording-medium cartridge, and, thus, prevents further insertion of the recording-medium cartridge; and when the recording-medium cartridge is inserted in a correct orientation, the fitting portion is fitted into the cut-off portion of the recording-medium cartridge, and the contacting portion is pushed by the front end of the recording-medium cartridge and moves in a direction such that further insertion of the recording-medium cartridge is enabled.

In the present invention, when the recording-medium cartridge is inserted in an erroneous orientation, the front end of the recording-medium cartridge comes into contact with the fitting portion located approximately in the middle of the cartridge inserting path, and the fitting portion prevents the recording-medium cartridge from being further inserted. As a result, it is possible to detect the erroneous insertion before the recording-medium cartridge is inserted to the last stage of the cartridge inserting path, and it is possible to prevent the recording-medium cartridge from being further inserted. As a result, it is possible to easily perform insertion of the recording-medium cartridge afresh in the correct orientation. Further, because the erroneous-insertion preventing mechanism is located approximately in the middle of the cartridge inserting path apart from the latch lever, it is possible to reduce the thickness of the device.

In the erroneous-insertion preventing mechanism:

the fitting portion and the contacting portion may be integrally formed; and the contacting portion may be driven by the front end of the recording-medium cartridge which is being inserted, and may retreat from the cartridge inserting path, and, thereby, the fitting portion may also retreat from the cartridge inserting path.

In this arrangement, the arrangement of the mechanism can be simplified and the number of components can be reduced.

In the erroneous-insertion preventing mechanism:

the fitting portion and the contacting portion may be provided separately;

the fitting portion may be provided movably between a first position and a second position, the first position being a position at which the fitting portion is inserted into the cut-off portion of the recording-medium cartridge which is being inserted, and the second position being a position out of the cartridge inserting path;

the contacting portion may be provided movably between a locking position and an unlocking position, the locking position being a position at which the front end of the recording-medium cartridge comes into contact with the fitting portion and the contacting portion prevents the fitting portion from moving from the first position to the second position, and the unlocking position being a position out of the cartridge inserting path, at which position the contacting portion enables the fitting portion to move from the first position to the second position;

when the recording-medium cartridge is inserted in an erroneous orientation, the front end of the recording-medium cartridge comes into contact with the fitting portion which is at the first position, and the fitting portion may prevent the recording-medium cartridge from being further inserted; and when the recording-medium cartridge is inserted in a correct orientation, the fitting portion may be fitted into the cut-off portion of the recording-medium cartridge, the contacting portion may be driven by the front end of the recording-medium cartridge and move to the unlocking position, the fitting portion may move to the second position, and further insertion of the recording-medium cartridge may be enabled.

In this arrangement, when the recording medium is inserted in an erroneous orientation, because the pushing force in the inserting direction is received by both the fitting portion and the contacting portion, the strength of the erroneous-insertion preventing mechanism against the cartridge insertion operation is increased.

Other objects and further features of the present invention will become more apparent from the following detailed description when read in conjunction with the accompanying drawings.

DETAILED DESCRIPTION OF THE PREFERRED EMBODIMENTS

Figure 5:
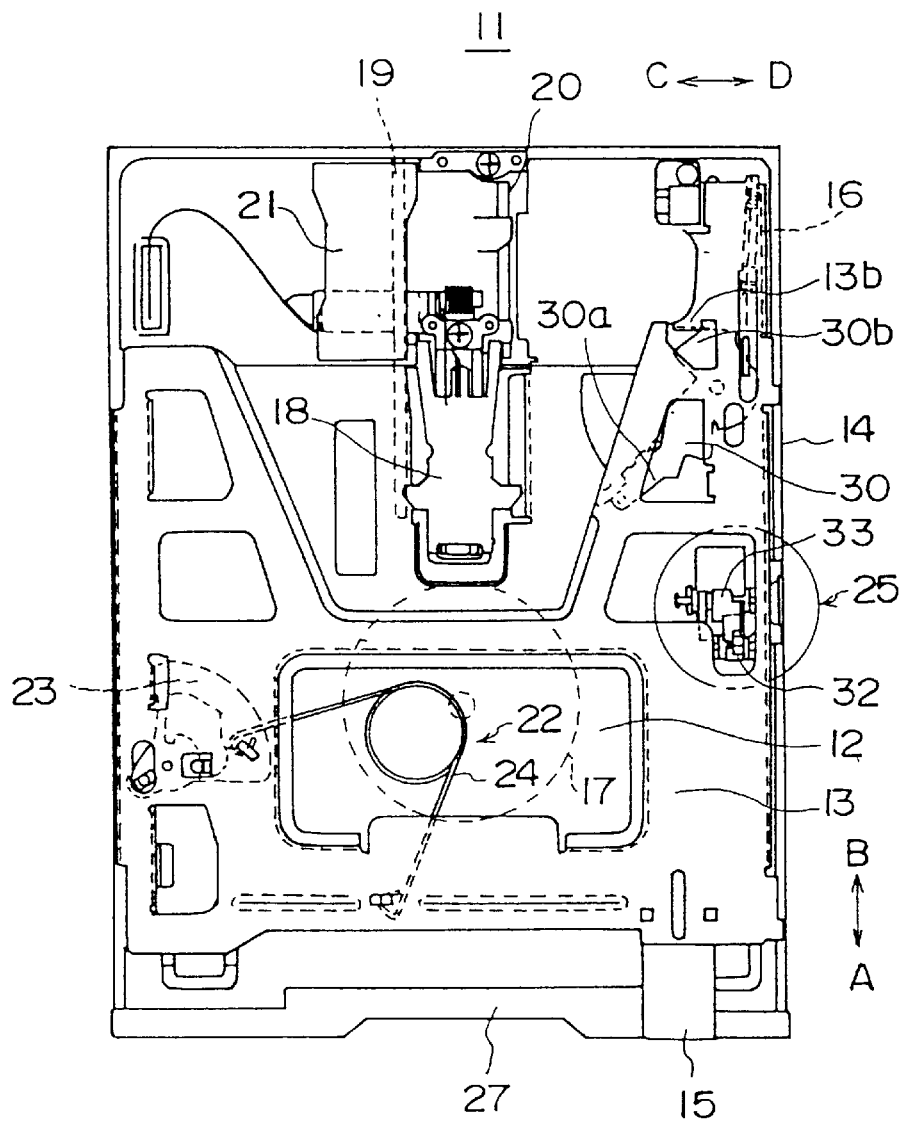
FIG. 5 shows a plan view of a magnetic disk device in which one embodiment of a recording-medium cartridge loading device according to the present invention is used.

FIG. 5 shows a plan view of a magnetic disk device 11 in which a recording-medium cartridge loading device in one embodiment of the present invention is used.

Figure 1:
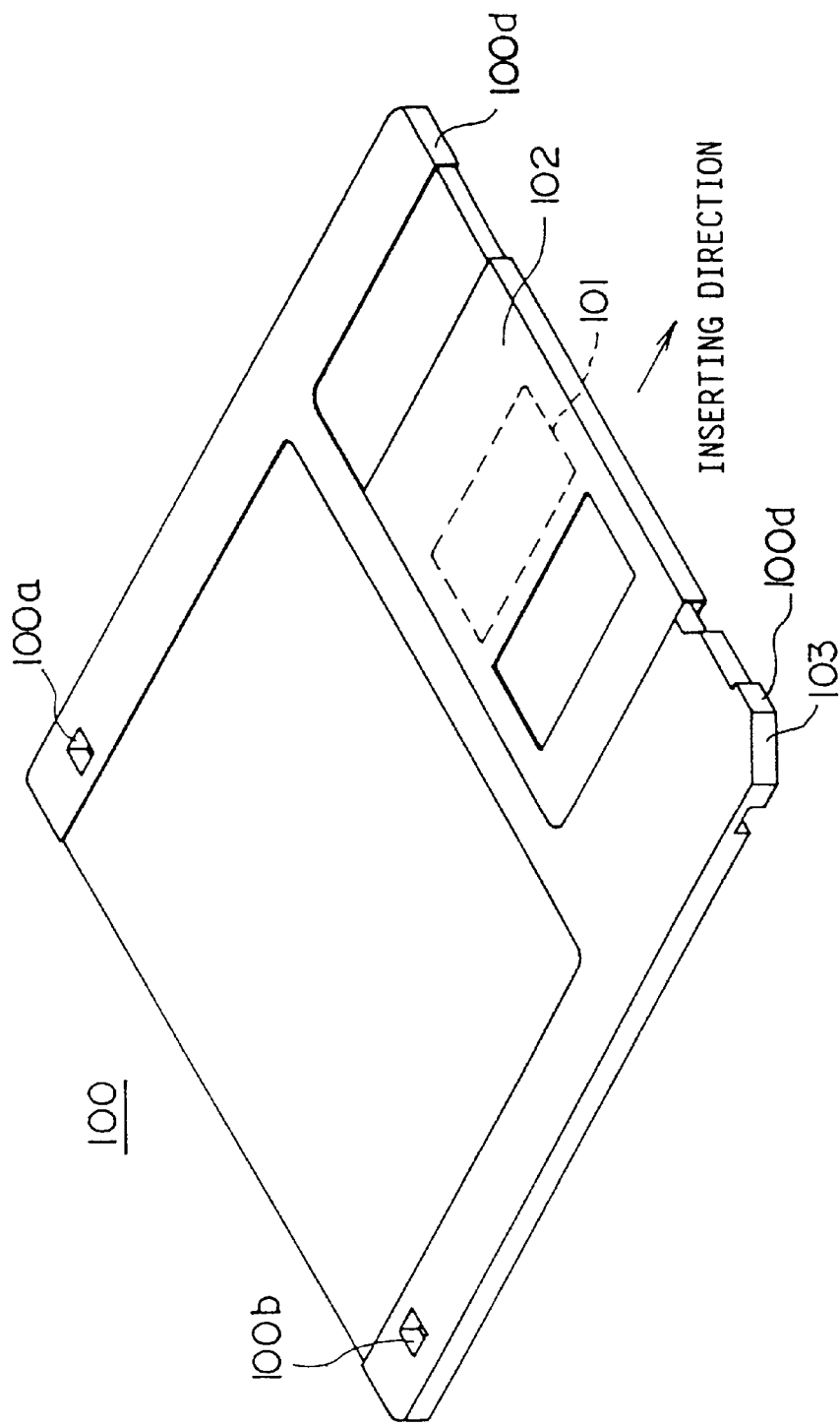
FIG. 1 shows a perspective view of a 2HD cartridge.
Figure 2:
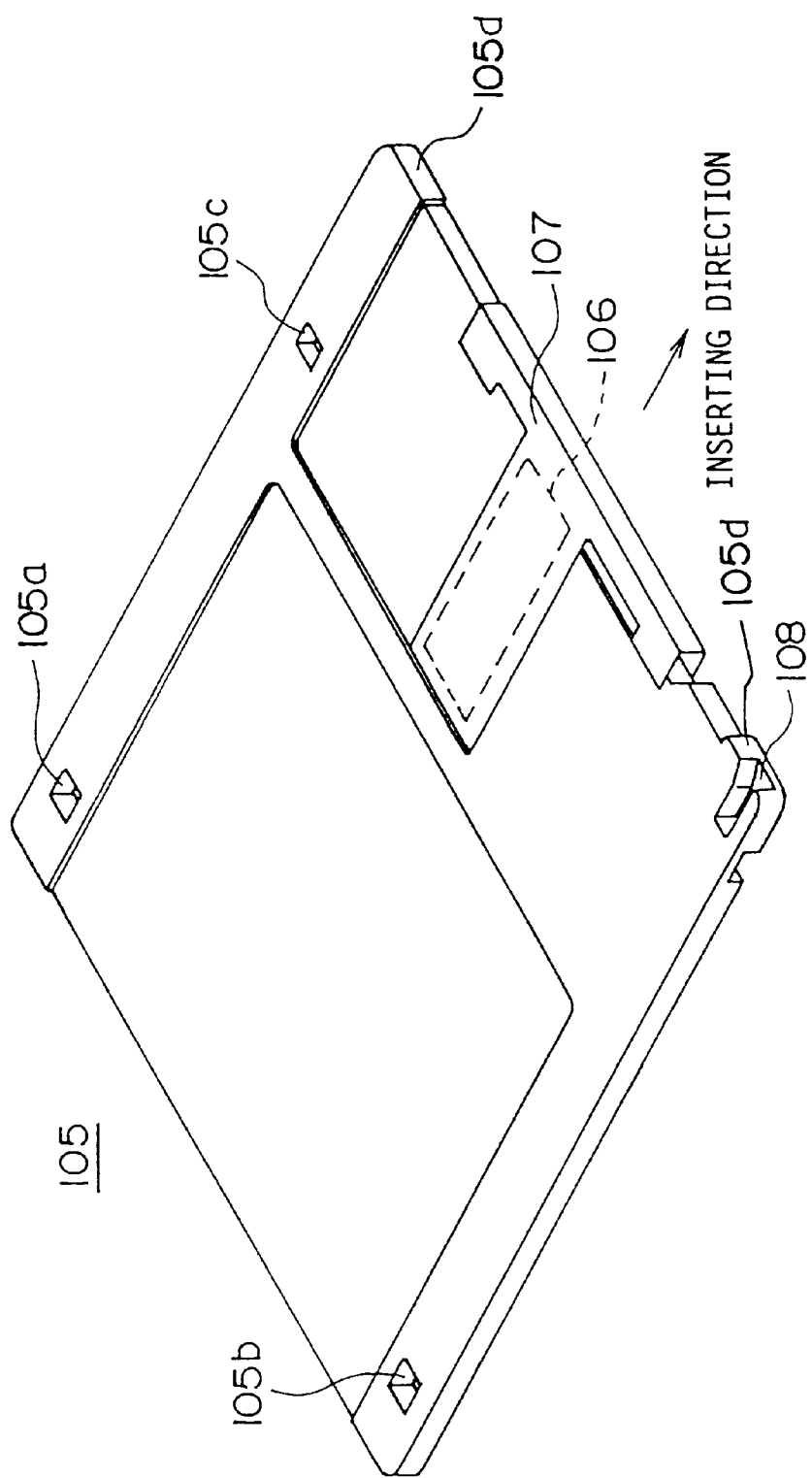
FIG. 2 shows a perspective view of an HiFD cartridge.
Figure 3:
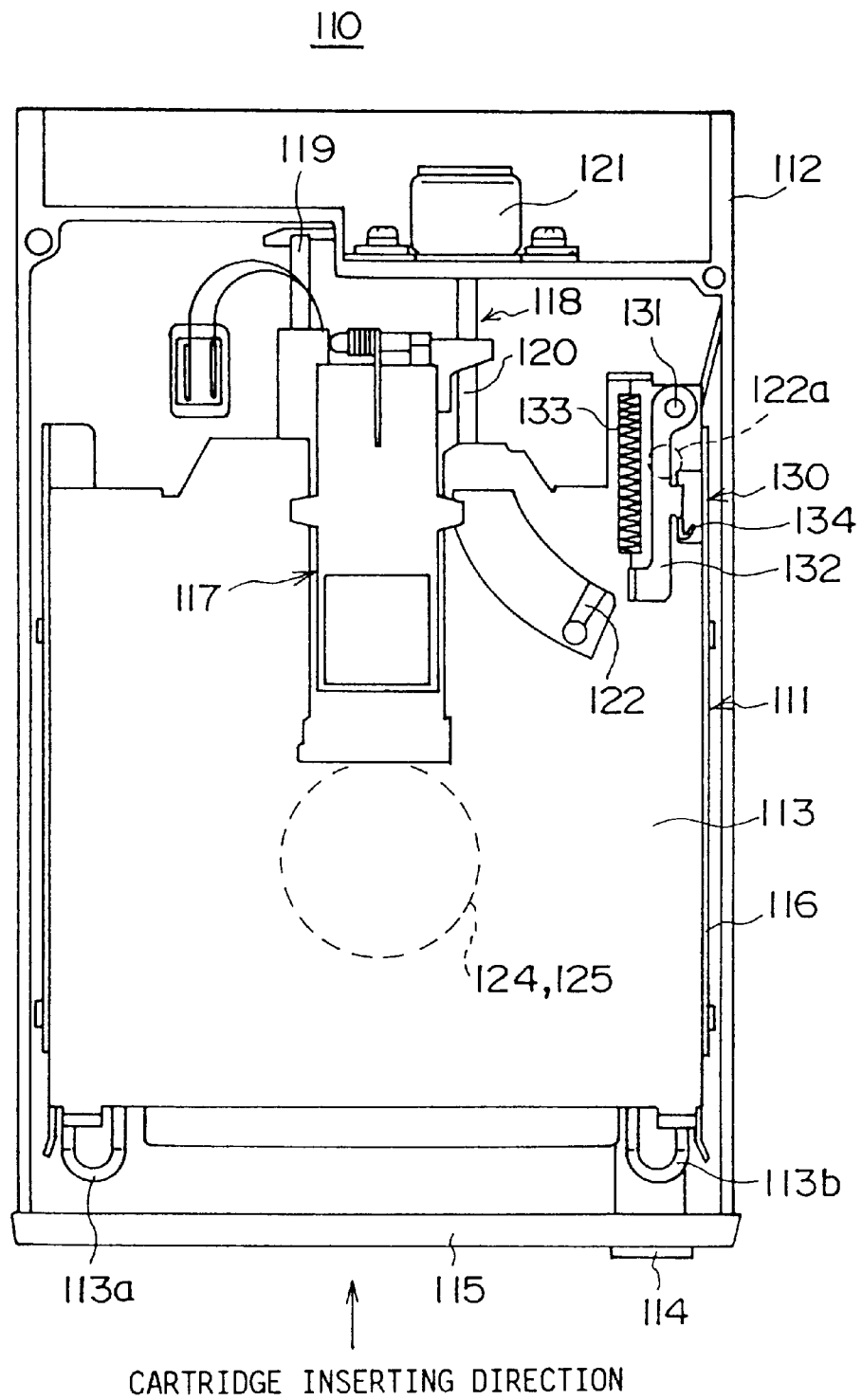
FIG. 3 shows a plan view of a magnetic disk device in which any one of cartridges 2DD, 2HD and 2HiFD can be loaded in the related art.
Figure 4A:
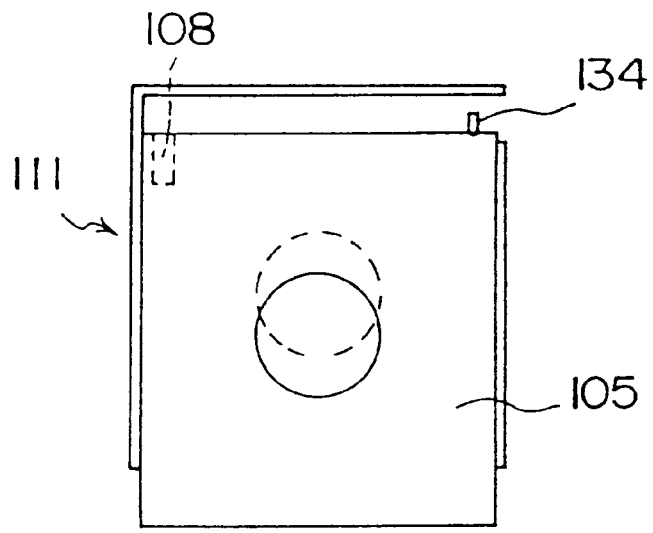
FIGS. 4A, 4B and 4C illustrate an operation of an erroneous-insertion preventing mechanism for orientations of cartridge insertion.
Figure 4B:
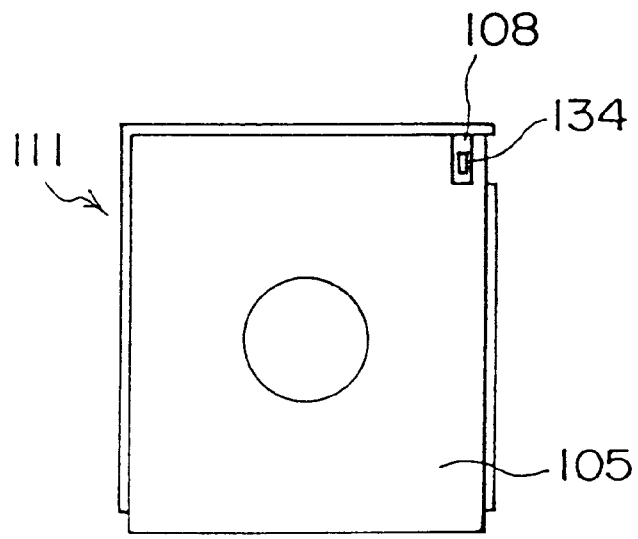
Figure 4C:
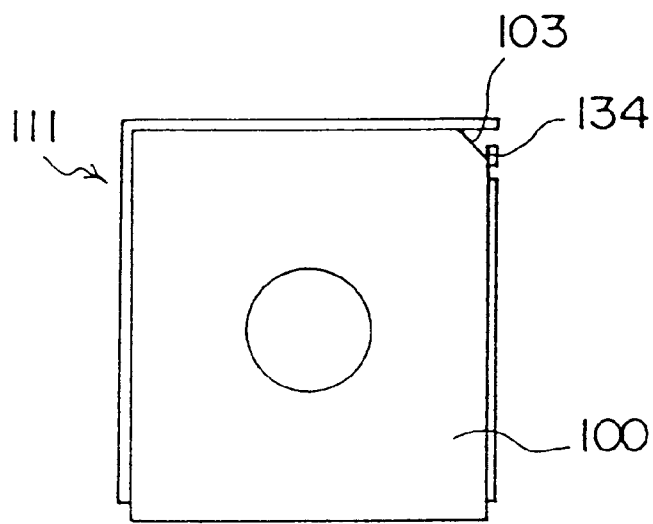

As shown in FIG. 5, in the magnetic disk device 11, a disk holder 12, into which a disk cartridge (not shown in the figure) is inserted, and a slider 13, which slides forward and backward so as to lift and lower the disk holder 12, are mounted on a frame 14. The slider 13 is provided slideably in directions A and B. When the disk cartridge 100 or 105 (see FIGS. 1 and 2) is inserted, the slider slides in the direction A and lowers the holder 12 from a cartridge insertion/ejection position to a cartridge loading position.

An ejecting button 15 is fixed at the right side of the front portion of the slider 13. Further, the slider 13 has a force applied thereto in the direction A by a coil spring 16.

On the frame, a turntable 17, which is driven by a motor which is used for rotating a disk, and a head carriage 18, which supports magnetic heads (not shown in the figure), are provided. On the bottom surface side of the frame 14, a circuit substrate (not shown in the figure) having a control circuit is mounted.

The head carriage 18 is movably provided as a result of being guided by guiding shafts 19 and 20 extending in the forward and backward directions (directions A and B).

The head carriage 18 guided by the guiding shafts 19 and 20 moves in the directions A and B as a result of being driven by a voice coil motor 21. Thereby, the magnetic heads supported by the head carriage 18 move in a radial direction of the magnetic disk (not shown in the figure) contained in the disk cartridge 100 or 105, and perform magnetic recording or reproducing on an arbitrary track.

On the bottom surface of the slider 13, a damper mechanism 22 is arranged. The damper mechanism 22 includes a damper plate 23, which is rotatably provided on the bottom surface of the slider 13, and a torsion spring 24 which applies force to the damper plate 23.

The torsion spring 24 of the damper mechanism 22 applies force to the slider 13 such that, during movement of the slider 13 from the cartridge insertion/ejection position to the cartridge loading position, the torsion spring 24 pushes the slider 13 in the direction (the direction B) reverse to the direction in which the slider 13 moves initially, and, then, after the damper plate 23 rotates more than a predetermined angle, the torsion spring 24 pushes the slider 13 in the direction (the direction A) in which the slider 13 moves.

Further, approximately in the middle of a cartridge inserting path, an erroneous-insertion preventing mechanism 25 is provided. The cartridge inserting path is a path in the disk holder 12 between the position at which the disk cartridge 100 or 105 is just started to be inserted in the disk holder 12 and the position at which the disk cartridge 100 or 105 is completely inserted in the disk holder 12. The erroneous-insertion preventing mechanism 25 enables insertion of the disk cartridge 100 or 105 only when the disk cartridge 100 or 105 is inserted in the correct orientation. The erroneous-insertion preventing mechanism 25 prevents insertion of the disk cartridge 100 or 105 when the disk cartridge 100 or 105 is inserted in an erroneous orientation.

Figure 6:
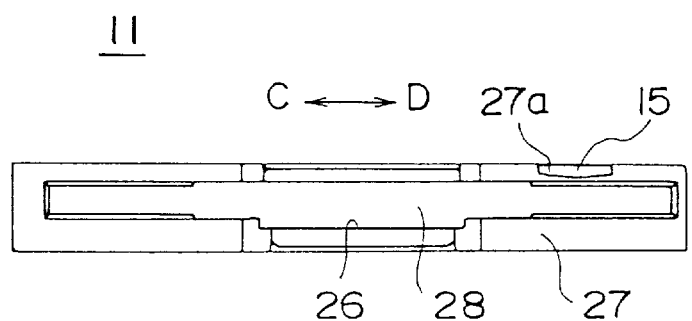
FIG. 6 shows a front elevational view of the magnetic disk device shown in FIG. 5.

FIG. 6 shows a front elevational view of the magnetic disk device 11.

As shown in FIG. 6, a bezel 27 having a disk inserting hole 26 is provided on the front end of the frame 14. A recess portion 27a into which the ejecting button 15 is slideably fitted is provided at the right side of the top end of the bezel 27. On the rear side of the bezel 27, a flap 28 for covering the disk inserting hole 26 from the inside is provided rotatably in opening/closing directions.

Figure 7:
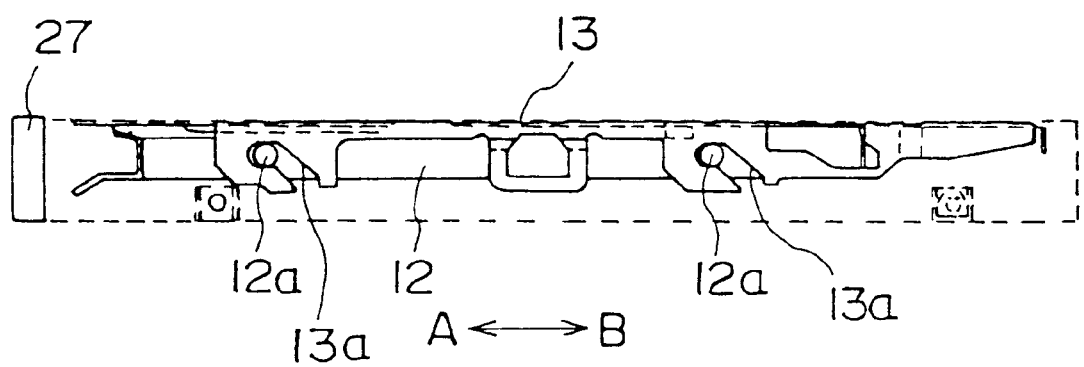
FIG. 7 shows a side elevational view indicating a condition in which a disk holder and a slider of the magnetic disk device shown in FIG. 5 are combined.

FIG. 7 shows a side elevational view indicating a condition in which the disk holder 12 and the slider 13 are combined.

As shown in FIG. 7, in inclined grooves 13a, provided at both sides of the slider 13, engagement pins 12a of the disk holder 12 are fitted, respectively. Thereby, as a result of the slider 13 sliding in the directions A and B, the engagement pins 12a are driven along the inclined grooves 13a. When the slider 13 slides in the direction B, the disk holder 12 rises to the cartridge insertion/ejection position. When the slider 13 slides in the direction A, the disk holder 12 falls to the cartridge loading position.

With reference to FIG. 5, on the frame 14, a latch lever 30 which engages with and prevents movement of the slider 12 is provided. The latch lever 30 has a lever portion 30a, which opens and closes the shutter 102 or 107 of the disk cartridge 100 or 105 (see FIGS. 1 and 2), and an arc-shaped engagement portion 30b, which engages with and prevents movement of the slider 13.

In this embodiment, as shown in FIG. 5, the erroneous-insertion preventing mechanism 25 is provided approximately in the middle of the path (the cartridge inserting path) through which the disk cartridge 100 or 105 is inserted, and the position of the erroneous-insertion preventing mechanism 25 is shifted in the direction A from the latch lever 30. As a result, the erroneous-insertion preventing mechanism 25 and the latch lever 30 do not overlap each other on the plan view. Therefore, it is possible to reduce the thickness of the magnetic disk device 11.

As a result of the disk cartridge 100 or 105 being inserted into the disk holder 12, the latch lever 30 is pushed by the front end of the disk cartridge and rotates clockwise. Then, after the arc-shaped engagement portion 30b comes to be apart from a to-be-engaged portion 13b of the slider 13, the slider 13 which has a force applied thereto by the coil spring 16 slides in the direction A.

As a result of the rotation of the latch lever 30, the projecting end of the lever portion 30a pushes the shutter 102 or 107 of the disk cartridge 100 or 105 (see FIGS. 1 and 2) in the opening direction so that the magnetic heads can slide on the magnetic disk.

When the ejecting button 15 is pressed in the direction B and the slider 13 slides in the same direction, the engagement and movement prevention of the engagement portion 30b which has been in contact with a side wall of the to-be-engaged portion 13b of the slider 13 is stopped. Thereby, the latch lever 30 is rotated counterclockwise by a spring (not shown in the figure). Thereby, the disk cartridge 100 or 105 which has been inserted into the disk holder 12 is pushed in the direction A by the latch lever 30 and is ejected.

Figure 8:
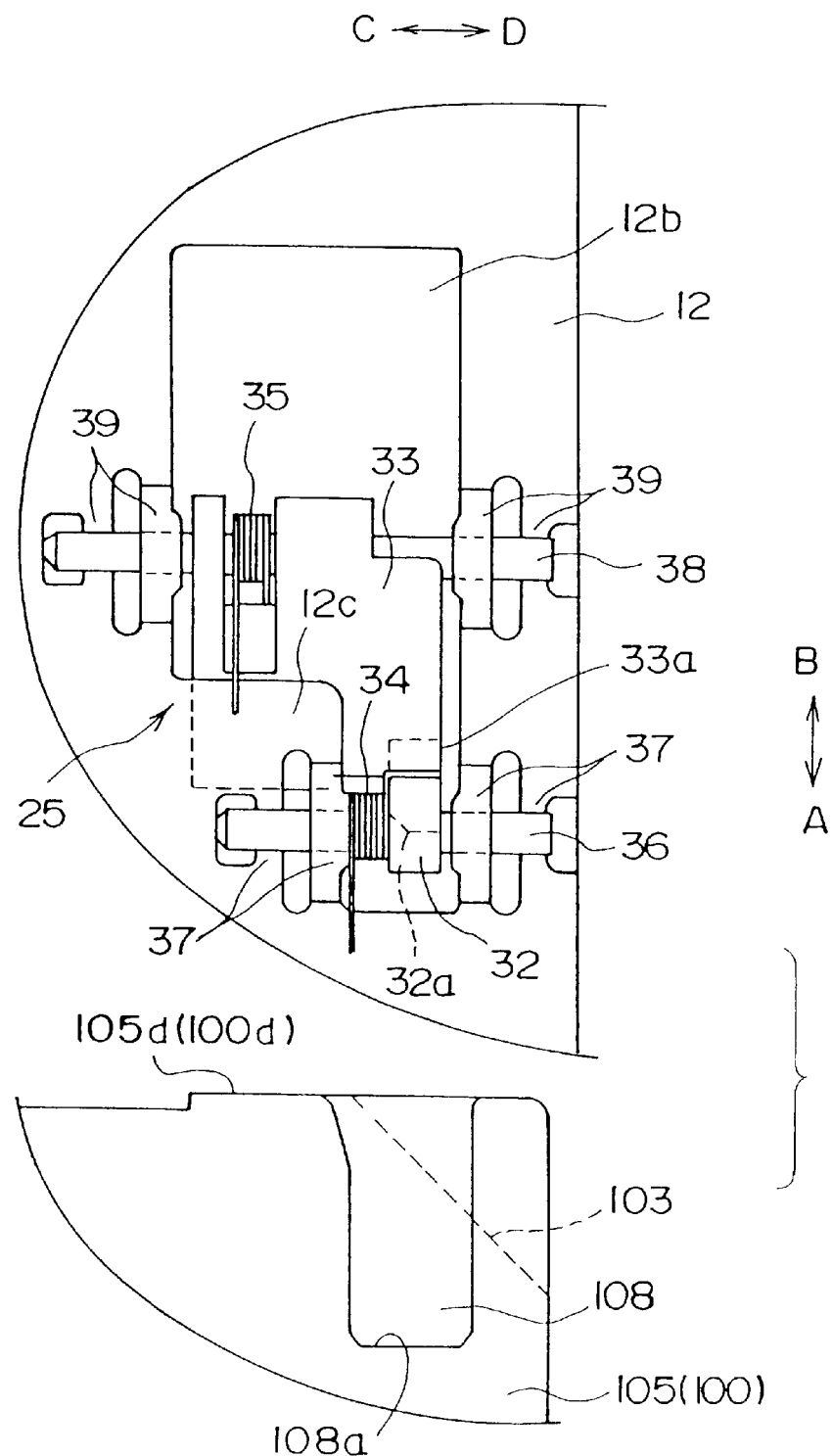
FIG. 8 shows a magnified plan view of an erroneous-insertion preventing mechanism of the magnetic disk device shown in FIG. 5.

FIG. 8 shows a magnified plan view of the erroneous-insertion preventing mechanism 25.

As shown in FIG. 8, the erroneous-insertion preventing mechanism 25 includes a first lever 32, which is provided in an opening 12b formed in the top plate of the disk holder 12, a second lever 33, which is provided in a rear direction of the first lever 32, a first torsion spring 34, which applies force to the first lever 32, and a second torsion spring 35, which applies force to the second lever 33.

A shaft 36 extending in directions C and D is inserted through the first lever 32. The shaft 36 is rotatably supported by bearing portions 37 which are formed as a result of the top plate of the disk holder 12 being cut and bent upward. The first lever 32 has a fitting portion 32a which engages or is fitted into the cut-off portion 103 or 108 of the disk cartridge 100 or 105. The fitting portion 32a comes into contact with the insertion-side end of the disk cartridge 100 or 105 when the disk cartridge 100 or 105 is inserted in an erroneous orientation.

A shaft 38 extending in the directions C and D is inserted through the second lever 33. The shaft 38 is rotatably supported by bearing portions 39 which are formed as a result of the top plate of the disk holder 12 being cut and bent upward. The second lever 33 has a contacting portion 33a which comes into contact with the rear surface of the first lever 32.

Figure 9A:
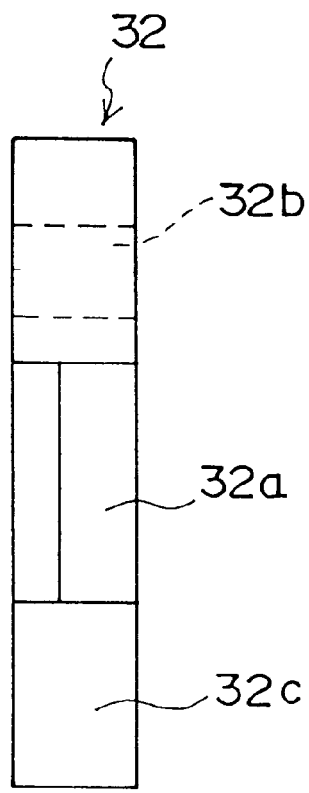
FIGS. 9A, 9B and 9C illustrate the shape of a first lever in the erroneous-insertion preventing mechanism shown in FIG. 8.
Figure 9B:
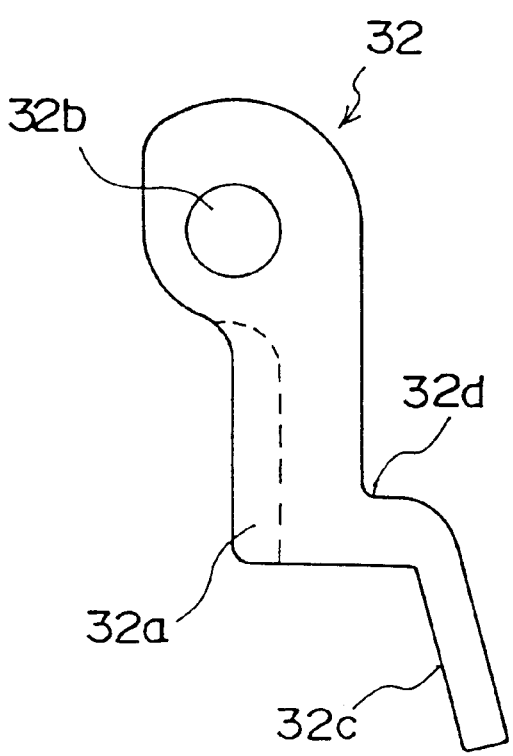
Figure 9C:
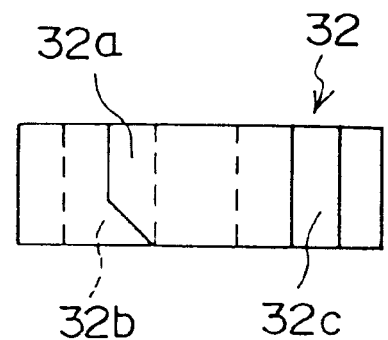

FIGS. 9A, 9B and 9C illustrate the shape of the first lever 32.

As shown in FIGS. 9A, 9B and 9C, the first lever 32 has the above-mentioned fitting portion 32a, a hole 32b, through which the shaft 36 is inserted above the fitting portion 32a, a first contacting portion 32c, which is bent to form a crank shape below the fitting portion 32a and comes into contact with the insertion-side end of the disc cartridge 100 or 105, and a step portion 32d, which is provided at the rear-surface side of the fitting portion 32a.

The fitting portion 32a, first contacting portion 32c and step portion 32d are shaped so as to, as will be described later, enable and prevent insertion of the disc cartridge 100 or 105 in response to a rotation position of the second lever 33.

Figure 10A:
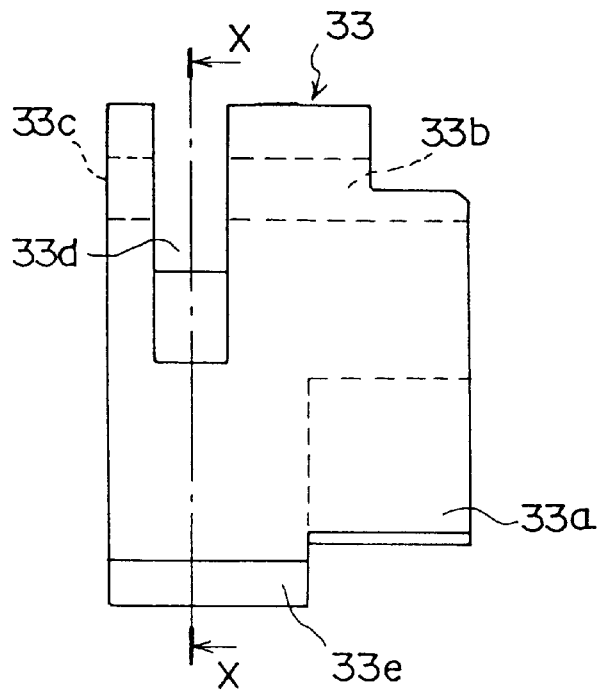
FIGS. 10A, 10B and 10C illustrate the shape of a second lever in the erroneous-insertion preventing mechanism shown in FIG. 8.
Figure 10B:
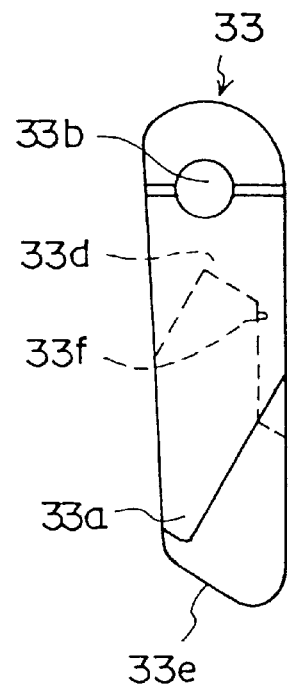
Figure 10C:
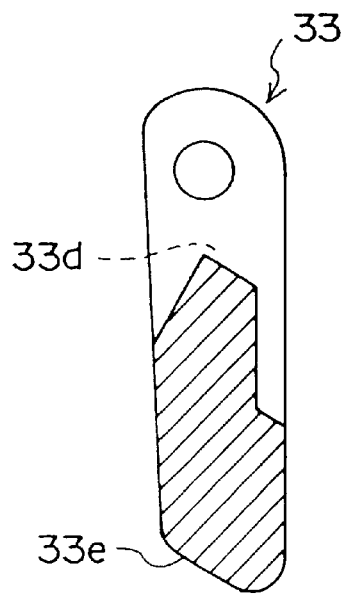

FIGS. 10A, 10B and 10C illustrate the shape of the second lever 33.

As shown in FIGS. 10A, 10B and 10C, the second lever 33 has the above-mentioned second contacting portion 33a, holes 33b and 33c, through which the shaft 38 is inserted, a recess portion 33d, in which the second torsion spring 35 is fitted, a third contacting portion 33e, which comes into contact with the insertion-side end of the disk cartridge 100 or 105 when the disk cartridge 100 or 105 is inserted in the correct orientation. On the rear-surface side of the second lever 33, an engagement recess portion 33f is provided, with which an end of the second torsion spring 35 engages.

The second contacting portion 33a and third contacting portion 33e are shaped so as to, as will be described later, enable and prevent insertion of the disk cartridge 100 or 105 in response to a rotation position of the first lever 32.

Figure 11A:
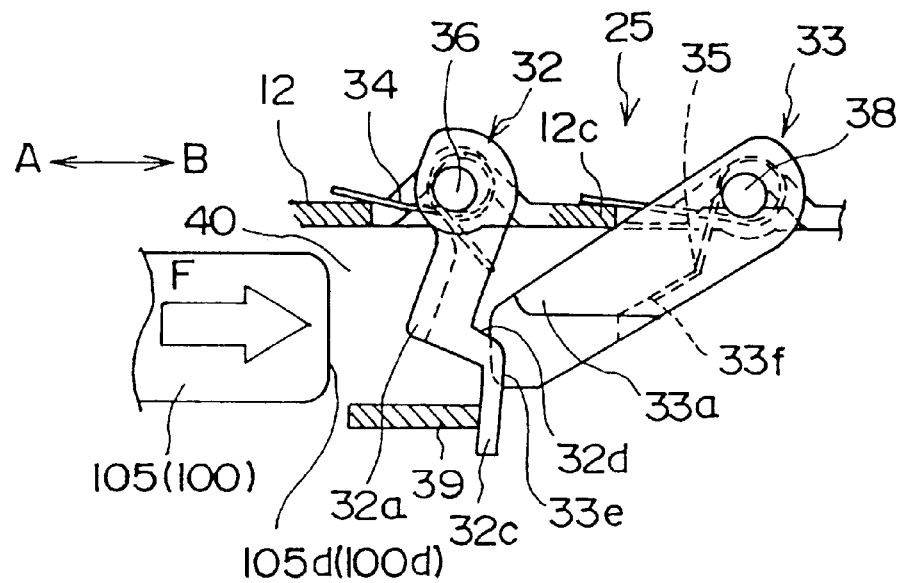
FIGS. 11A and 11B illustrate the operation of the erroneous-insertion preventing mechanism shown in FIG. 8 in a case where a disk cartridge is inserted in an erroneous orientation.
Figure 11B:
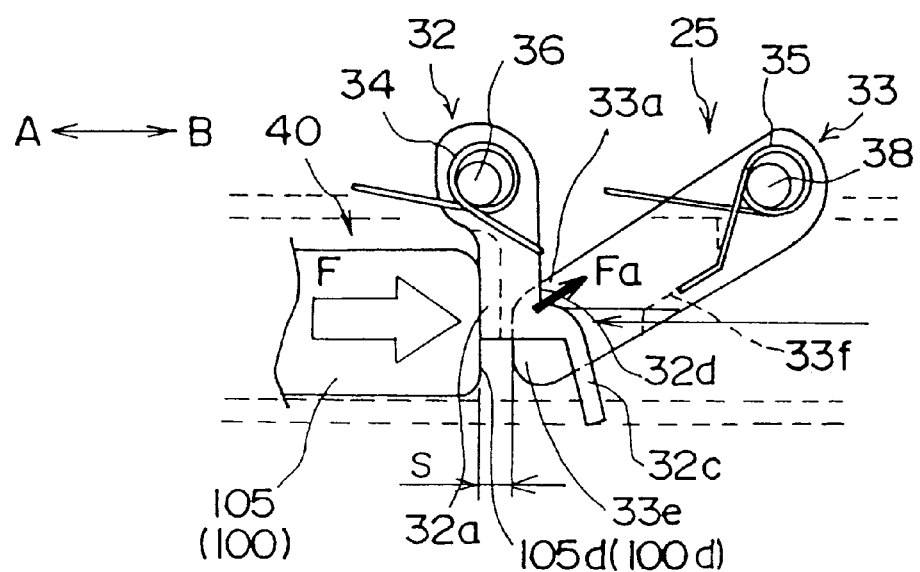
Figure 12A:
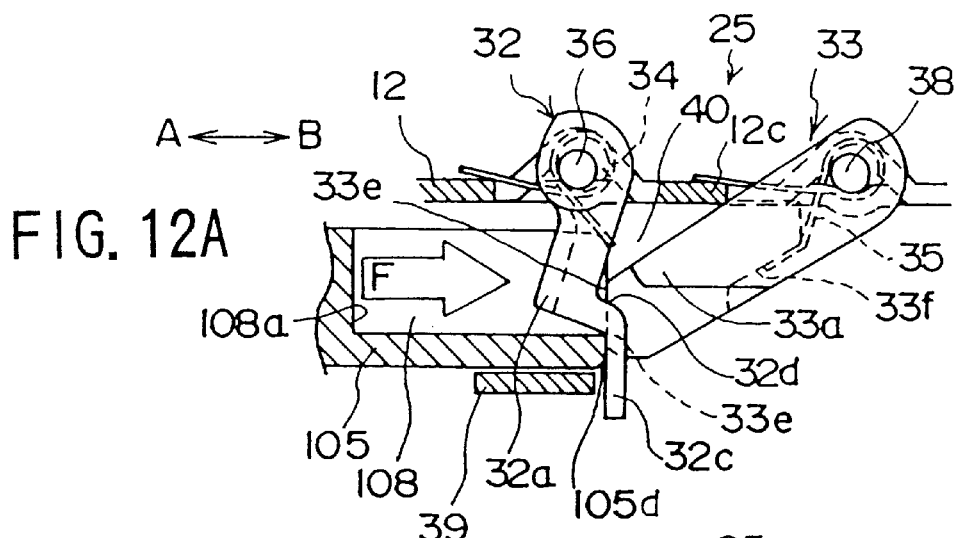
FIGS. 12A, 12B and 12C illustrate the operation of the erroneous-insertion preventing mechanism shown in FIG. 8 in a case where the disk cartridge is inserted in the correct orientation.
Figure 12B:
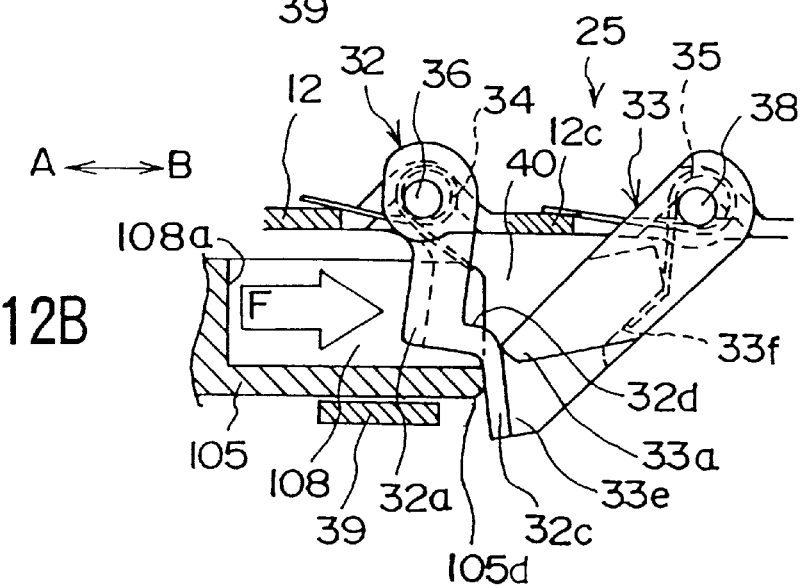
Figure 12C:
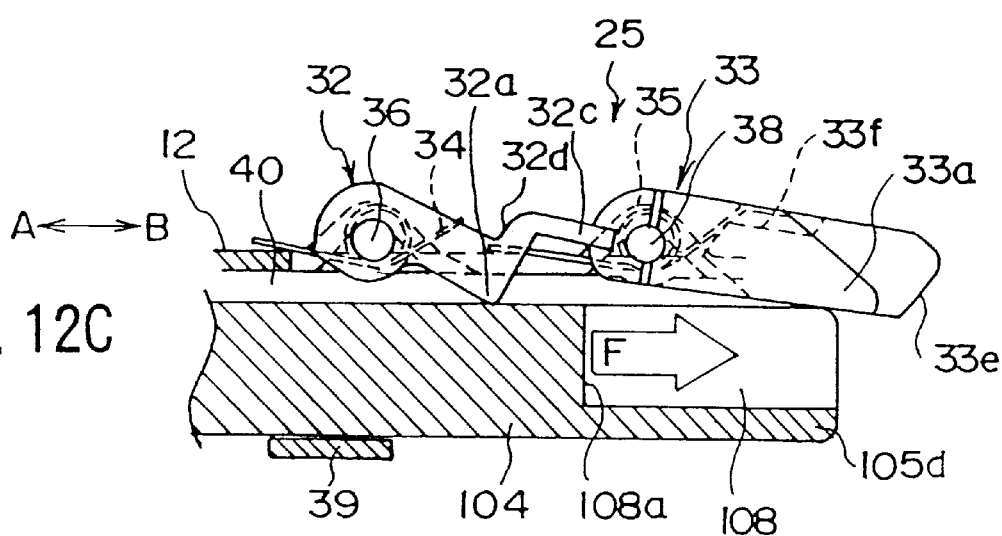

FIGS. 11A and 11B illustrate an operation of the erroneous-insertion preventing mechanism 25 in a case where the disk cartridge 105 is inserted in an erroneous orientation. FIGS. 12A, 12B and 12C illustrate an operation of the erroneous-insertion preventing mechanism 25 in a case where the disk cartridge 105 is inserted in the correct orientation.

As shown in FIG. 11A, the first and second levers 32 and 33 have a force applied thereto clockwise by the torsion springs 34 and 35, respectively. The first lever 32 stops in a condition in which the first contacting portion 32c is in contact with a stopper 39 provided on the bottom-surface side of the disk holder 12, that is, in a condition in which the first lever 32 extends in the vertical direction so as to block a cartridge inserting path 40. The second lever 33 stops in an inclined condition in which the second lever 33 is in contact with an edge portion 12c of the opening 12b formed in the top plate of the disk holder 12, and the third contacting portion 33e is apart from the rear surface of the first lever 32 by a predetermined distance.

Then, when the disk cartridge 105 is inserted in an erroneous orientation, the cut-off portion 108 of the disk cartridge 105 does not face the fitting portion 32a of the first lever 32, and the insertion-side end 105d of the disk cartridge 105 comes into contact with the fitting portion 32a.

As a result of the insertion-side end 105d of the disk cartridge 105 coming into contact with the fitting portion 32a of the first lever 32 with an operation force F, the fitting portion 32a of the first lever 32 rotates counterclockwise. At this time, the second lever 33 does not come into contact with the insertion-side end 105d of the disk cartridge 105, and does not rotate counterclockwise.

As shown in FIG. 11B, when the disk cartridge 105 is inserted in an erroneous orientation, the fitting portion 32a of the first lever 32 is pushed by the insertion-side end 105d of the disk cartridge 105, and a force Fa for rotating the first lever 32 counterclockwise occurs. Thereby, the step portion 32d provided at the rear-surface side comes into contact with the second contacting portion 33a of the second lever 33 from the bottom.

On the other hand, because the end of the third contacting portion 33e of the second lever 33 is apart from the insertion-side end 105d of the disk cartridge 105 by a gap S, no force for rotating the second lever 33 occurs.

As a result, the second lever 33 enters a condition in which the second lever 33 cannot rotate as a result of the second contacting portion 33a being locked by the step portion 32d of the first lever 32. Further, the second lever 33 prevents the first lever 23 from further rotating counterclockwise.

Thus, in the erroneous-insertion preventing mechanism 25, the first lever 32 and the second lever 33 stop rotation as a result of the rotation being prevented by one another. Thus, the erroneous-insertion preventing mechanism enters an erroneous-insertion preventing condition in which insertion of the disk cartridge 105 is prevented. Thereby, erroneous insertion of the disk cartridge 105 is prevented approximately in the middle of the cartridge inserting path 40, and it is not possible to further insert the disk cartridge 105 into the disk holder 12.

Thus, when the disk cartridge 105 is inserted in an erroneous orientation, the first and second levers 32 and 33 are locked by one another in a rotation-impossible condition. Thereby, the cartridge inserting path 40 in the disk holder 12 is blocked by the first and second levers 32 and 33, and further insertion of the disk cartridge 105, which has been inserted in an erroneous orientation, is prevented.

As a result, because the insertion of the disk cartridge 105 is prevented approximately in the middle of the cartridge inserting path 40, an operator determines that the orientation of the disk cartridge 105 is erroneous. Thus, in the erroneous-insertion preventing mechanism 25, it is possible to detect erroneous insertion approximately in the middle of the cartridge inserting path 40 before the disk cartridge 105 is inserted to the last stage into the disk holder 12. As a result, it is possible to easily perform insertion of the disk cartridge 105 afresh in the correct orientation.

Further, in the erroneous-insertion preventing mechanism 25, the first and second levers 32 and 33 receive the force F of the disk cartridge 105 in the inserting direction. Thereby, even when insertion is performed with a relatively large force, the erroneous-insertion preventing mechanism 25 is not deformed and can endure the operation force F.

Further, when the low-capacity disk cartridge 100 is inserted in an erroneous orientation, the insertion-side end 100d of the disk cartridge 100 comes into contact with the fitting portion 32a of the first lever 32. Thereby, the first and second levers 32 and 33 enter the mutual rotation-impossible condition, and prevent further insertion of the disk cartridge 100. Thus, similar to the case of the high-capacity disk cartridge 105, the insertion is prevented when the low-capacity disk cartridge 100 is inserted in an erroneous orientation.

As shown in FIG. 12A, when the disk cartridge 105 is inserted in the correct orientation, the cut-off portion 108 of the disk cartridge 105 faces the fitting portion 32a of the first lever 32. Thereby, when the disk cartridge 105 is inserted with the operation force F, the fitting portion 32a of the first lever 32 is relatively inserted into the cut-off portion 108 approximately in the middle of the cartridge inserting path 40 of the disk holder 12.

At the same time, the insertion-side end 105d of the disk cartridge 105 comes into contact with the first contacting portion 32c of the first lever 32 and the third contacting portion 33e of the second lever 33. Thereby, when the disk cartridge 105 is further inserted, the first lever 32 rotates counterclockwise against the spring force of the torsion spring 34, and also, the second lever 33 rotates counterclockwise against the spring force of the torsion spring 35.

As shown in FIG. 12B, the fitting portion 32a of the first lever 32 is relatively inserted into the groove of the cut-off portion 108 as the disk cartridge 105 is inserted. Thereby, the first contacting portion 32c comes into contact with the projecting end of the second contacting portion 33a of the second lever 33 in a condition in which the first contacting portion 32c is inclined. Thereby, the second contacting portion 33a of the second lever 33 is pushed by the rear surface of the first contacting portion 32c, and the second lever 33 rotates counterclockwise. Thus, locking of the first lever 32 by the second lever 33 is released.

When the disk cartridge 105 is further inserted, the second contacting portion 33a of the second lever 33 is pushed by the rear surface of the first contacting portion 32c, and, thereby, rotates counterclockwise.

Then, as shown in FIG. 12C, the fitting portion 32a of the first lever 32 comes into contact with a wall portion 108a of the cut-off portion 108, and the first lever 32 retreats above the cut-off portion 108. Further, the front surface of the second lever 33 is pushed by the insertion-side end 105d of the disk cartridge 105, and the second lever 33 retreats above the disk cartridge 105.

Thus, the erroneous-insertion preventing mechanism 25 enters a condition in which insertion of the disk cartridge 105 is enabled. As a result, it is possible to insert the disk cartridge 105 to the last stage of the cartridge inserting path 40.

When the low-capacity disk cartridge 100 is inserted in the correct orientation, the third contacting portion 33e of the second lever 33 is driven by the insertion-side end 100d of the disk cartridge 100, and rotates counterclockwise. Thereby, the second lever 33 releases locking of the first lever 32. Then, the fitting portion 32a of the first lever 32 slides on the inclined surface of the cut-off portion 103, and the first lever 32 retreats upward. Then, the third contacting portion 33e is pushed by the insertion-side end 100d of the disk cartridge 100, and the second lever 33 retreats upward.

Thus, similar to the case of the high-capacity disk cartridge 105, when the low-capacity disk cartridge 100 is inserted in the correct orientation, the erroneous-insertion preventing mechanism 25 enables insertion of the low-capacity disk cartridge 100.

Further, when the disk cartridge 100 or 105 is inserted in the correct orientation, the first and second levers 32 and 33 have a force applied thereto so as to rotate clockwise by the spring force of the torsion springs 34 and 35, respectively, as shown in FIG. 12C. Thus, the first and second levers 32 and 33 push the top surface of the disk cartridge 100 or 105. Thereby, when the disk cartridge 100 or 105 is ejected, the pushing force of the first and second levers 32 and 33 acts as a load against the ejection operation. As a result, the speed of the ejection operation is decreased. Thus, at the time of the ejection operation, due to the pushing force of the first and second levers 32 or 33, flying out of the disk cartridge 100 or 105 from the disk inserting hole 26 is prevented.

Figure 13:
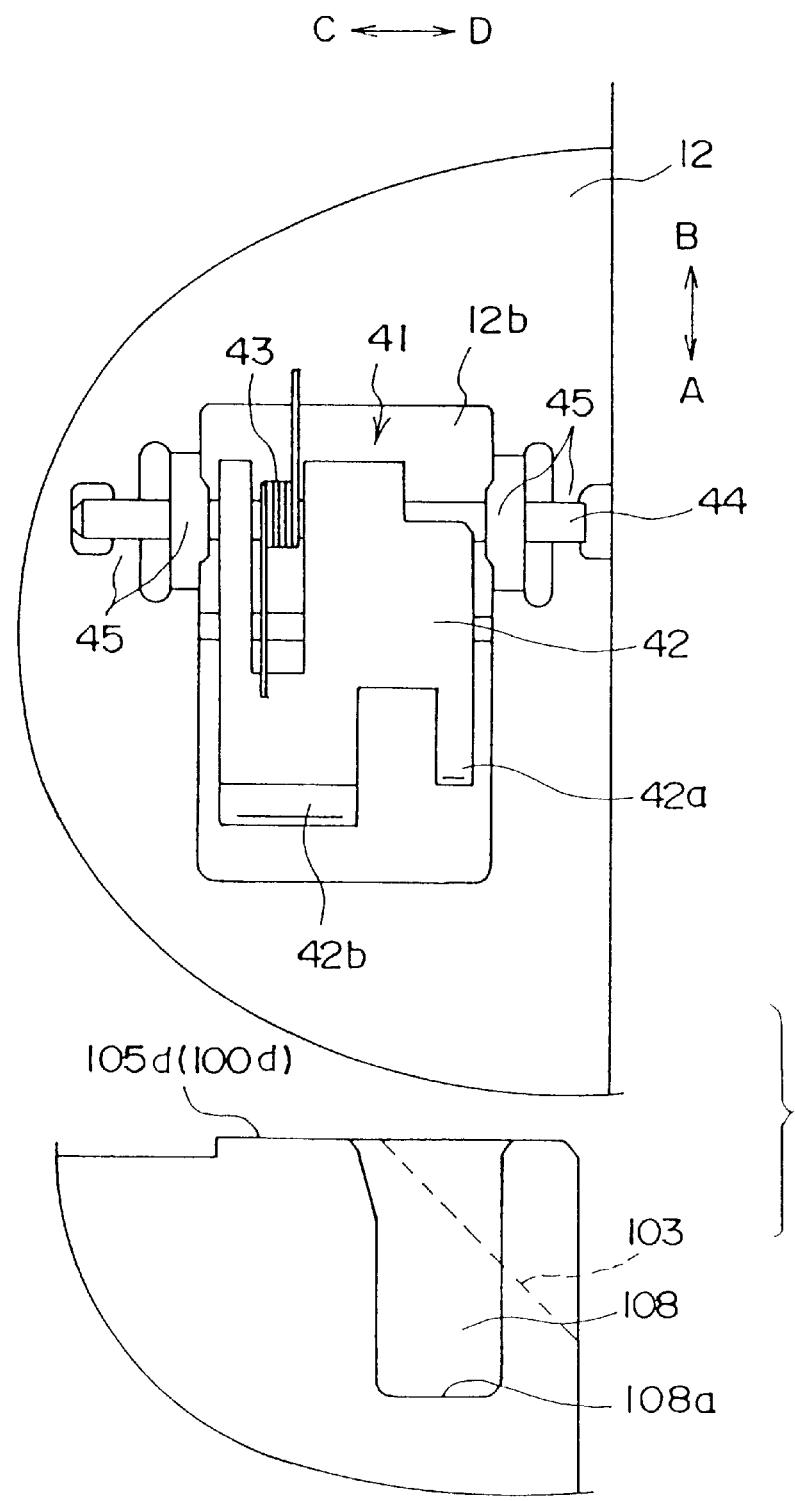
FIG. 13 shows a plan view of a first variant embodiment of the erroneous-insertion preventing mechanism.

FIG. 13 shows a plan view for illustrating an erroneous-insertion preventing mechanism 41 in a first variant embodiment of the present invention.

As shown in FIG. 13, the erroneous-insertion preventing mechanism 41 includes a lever 42, which is provided in the opening 12b formed in the top plate of the disk holder 12, and a torsion spring 43 which applies a force to the lever 42. Thus, in the erroneous-insertion preventing mechanism 41, a single lever 42 can prevent erroneous insertion of the disk cartridge 100 or 105. Thereby, the arrangement of the mechanism is simplified and the number of components is reduced.

A shaft 44 extending in the directions C and D is inserted through the lever 42. The shaft 44 is rotatably supported by bearing portions 45 which are formed as a result of the top plate of the disk holder 12 being cut and bent upward. The lever 42 includes a fitting portion 42a which engages with or is fitted into the cut-off portion 103 or 108 of the disk cartridge 100 or 105, and a contacting portion 42b which comes into contact with the insertion-side end 100d or 105d of the disk cartridge 100 or 105.

The fitting portion 42a comes into contact with the insertion-side end 100d or 105d of the disk cartridge 100 or 105 when the disk cartridge 100 or 105 is inserted in an erroneous orientation. The contacting portion 42b includes an inclined surface which is inclined at an angle of 45° with respect to the cartridge inserting direction (direction B).

Figure 14A:
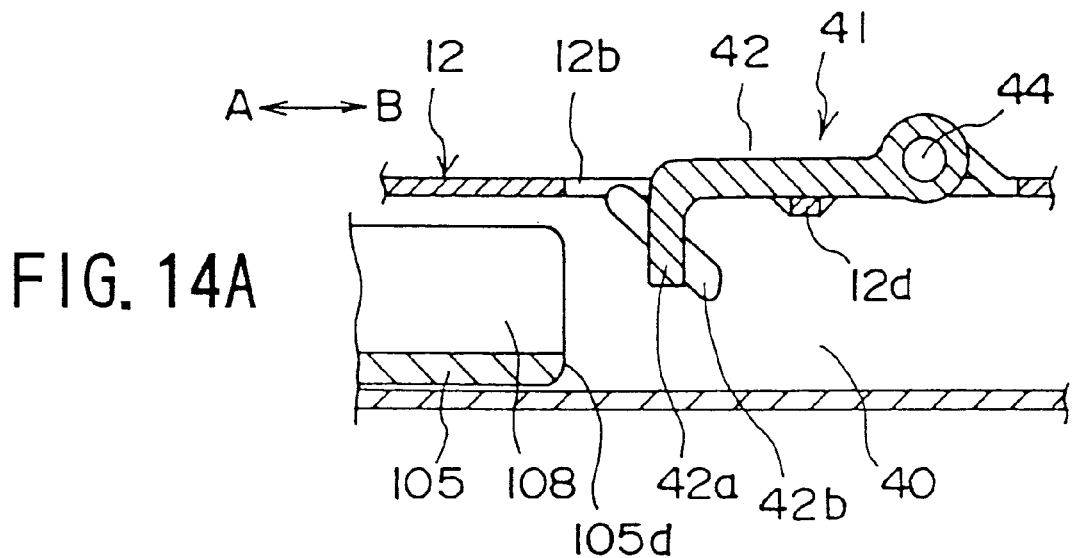
FIGS. 14A, 14B and 14C illustrate the operation of the first variant embodiment shown in FIG. 13 in a case where the disk cartridge is inserted in the correct orientation.
Figure 14B:
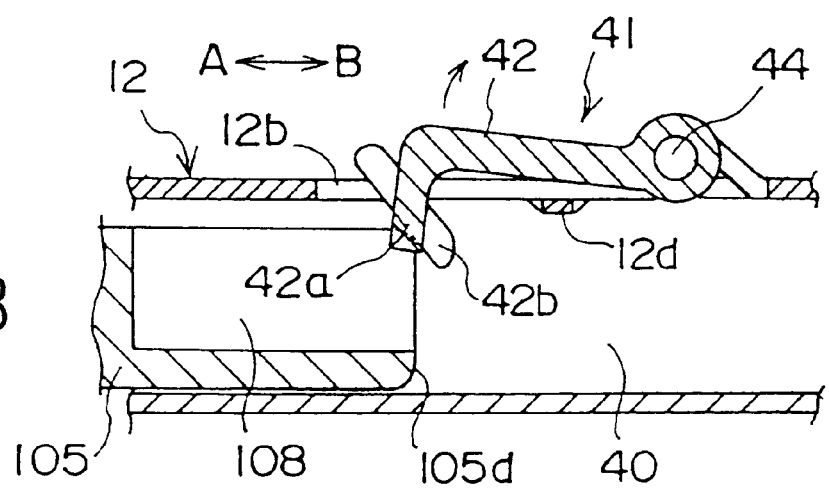
Figure 14C:
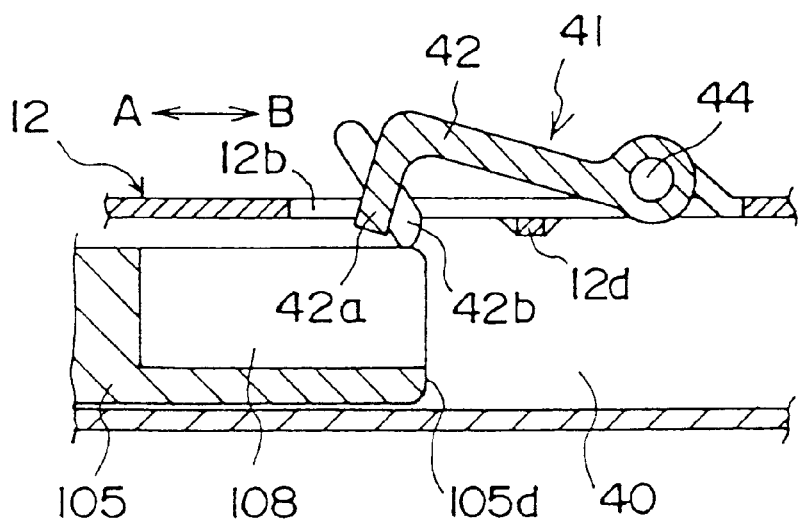

With reference to FIGS. 14A, 14B and 14C, an operation of the erroneous-insertion preventing mechanism 41 in a case where the disk cartridge 105 is inserted in the correct orientation will now be described.

In a condition shown in FIG. 14A, the lever 42 has a force applied thereto counterclockwise by the torsion spring 43. In the condition in which the cartridge has not been inserted, the lever 42 is in contact with a supporting portion 12d, which is laterally laid in the opening 12b of the disk holder 12, and keeps a horizontal condition. At this time, because the fitting portion 42a is bent downward, the fitting portion 42a projects into the disk holder 12 from the opening 12b. Further, the contacting portion 42b projects into the disk holder 12 from the opening 12b in a condition in which the contacting portion 42b is inclined at 45°.

When the disk cartridge 105 is inserted in the correct orientation, the cut-off portion 108 of the disk cartridge 105 faces the fitting portion 42a of the lever 42. Therefore, when the disk cartridge 105 is pushed with the operation force F, the fitting portion 42a of the lever 42 is relatively fitted into the cut-off portion 108 approximately in the middle of the cartridge inserting path 40 in the disk holder 12.

As shown in FIG. 14B, as mentioned above, the fitting portion 42a of the lever 42 is relatively fitted into the groove of the cut-off portion 108 in response to the insertion of the disk cartridge 105. As a result, the inclined surface of the contacting portion 42b is pushed by the insertion-side end 105d of the disk cartridge 105. Thereby, when the disk cartridge 105 is further inserted, the lever 42 rotates upward against the spring force of the torsion spring 43.

As shown in FIG. 14C, in response to the further insertion of the disk cartridge 105, the lever 42 rotates upward and the fitting portion 42a and the contacting portion 42b retreat from the cartridge inserting path 40. Thereby, the erroneous-insertion preventing mechanism 41 enters a condition in which insertion of the disk cartridge 105 is enabled. As a result, it is possible to insert the disk cartridge 105 to the last stage of the cartridge inserting path 40.

When the low-capacity cartridge 100 is inserted in the correct orientation, the contacting portion 42b slides on the insertion-side end 100d and the fitting portion 42a of the lever 42 retreats upward. Thus, similar to the case of the high-capacity disk cartridge 105, when the low-capacity disk cartridge 100 is inserted in the correct orientation, the erroneous-insertion preventing mechanism 41 enables insertion of the low-capacity disk cartridge 100.

Further, when the disk cartridge 100 or 105 is inserted in the correct orientation, the lever 42 has a force applied thereto so as to rotate counterclockwise by the spring force of the torsion spring 43, as shown in FIG. 14C. Thus, the lever 42 pushes the top surface of the disk cartridge 100 or 105. Thereby, when the disk cartridge 100 or 105 is ejected, the pushing force of the lever 42 acts as a load against the ejection operation. As a result, the speed of the ejection operation is decreased. Thus, at the time of the ejection operation, due to the pushing force of the lever 42, flying out of the disk cartridge 100 or 105 from the disk inserting hole 26 is prevented.

Next, with reference to FIGS. 15A and 15B, an operation of the erroneous-insertion preventing mechanism 41 in a case where the high-capacity disk cartridge 105 is inserted in an erroneous orientation will now be described.

Figure 15A:
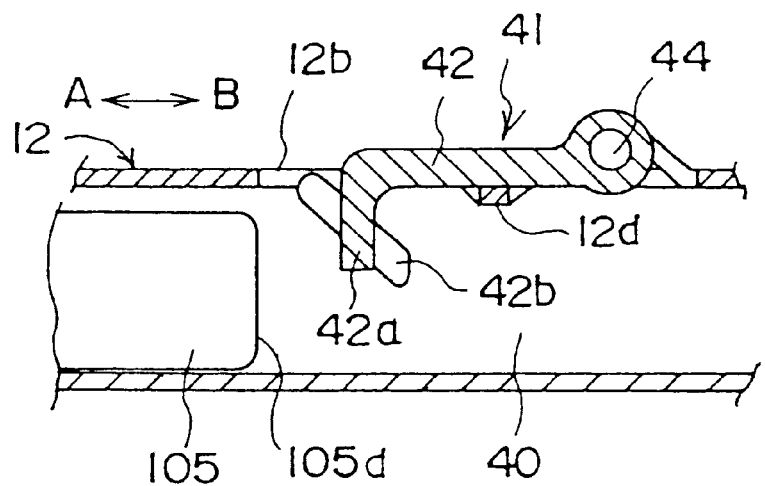
FIGS. 15A and 15B illustrate the operation of the first variant embodiment shown in FIG. 13 in a case where the disk cartridge is inserted in an erroneous orientation.

As shown in FIG. 15A, when the disk cartridge 105 is inserted in an erroneous orientation, the cutoff portion 108 of the disk cartridge 105 does not face the fitting portion 42a of the lever 42, and the insertion-side end 105d of the disk cartridge 105 faces the fitting portion 42a of the lever 42 extending vertically downward.

Figure 15B:
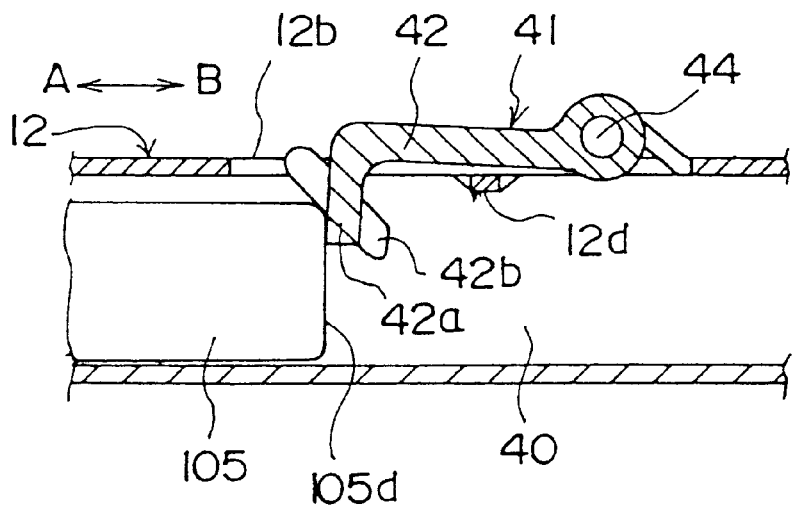

As shown in FIG. 15B, in response to insertion of the disk cartridge 105 in an erroneous orientation, the fitting portion 42a of the lever 42 comes into contact with the insertion-side end 105d of the disk cartridge 105.

Thereby, the lever 42 comes into contact with the insertion-side end 105d of the disk cartridge 105, enters a condition in which the lever 42 cannot rotate upward, and, thus, enters an erroneous-insertion preventing condition in which insertion of the disk cartridge 105 is prevented. Thereby, erroneous insertion of the disk cartridge 105 is prevented approximately in the middle position of the cartridge inserting path 40, and it is not possible to further insert the disk cartridge 105 into the disk holder 12.

Thus, when the disk cartridge 105 is inserted in an erroneous orientation, rotation of the lever 42 is prevented and the lever 42 is locked into a rotation-impossible condition. Thereby, in the cartridge inserting path 40 in the disk holder 12, insertion of the disk cartridge 105 in an erroneous orientation is prevented.

Therefore, because insertion of the disk cartridge 105 into the disk holder 12 is prevented approximately in the middle of the cartridge inserting path 40, an operator determines that the orientation of the disk cartridge 105 has been erroneous. Thus, in the erroneous-insertion preventing mechanism 41, it is possible to detect an erroneous insertion approximately in the middle of the cartridge inserting path 40 before the disk cartridge 105 is inserted to the last stage into the disk holder 12. As a result, it is possible to easily perform insertion of the disk cartridge 105 afresh in the correct orientation.

Further, the erroneous-insertion preventing mechanism 41 prevents insertion when the low-capacity disk cartridge 100 is erroneously inserted, similar to the case of the high-capacity disk cartridge 105.

Figure 16:
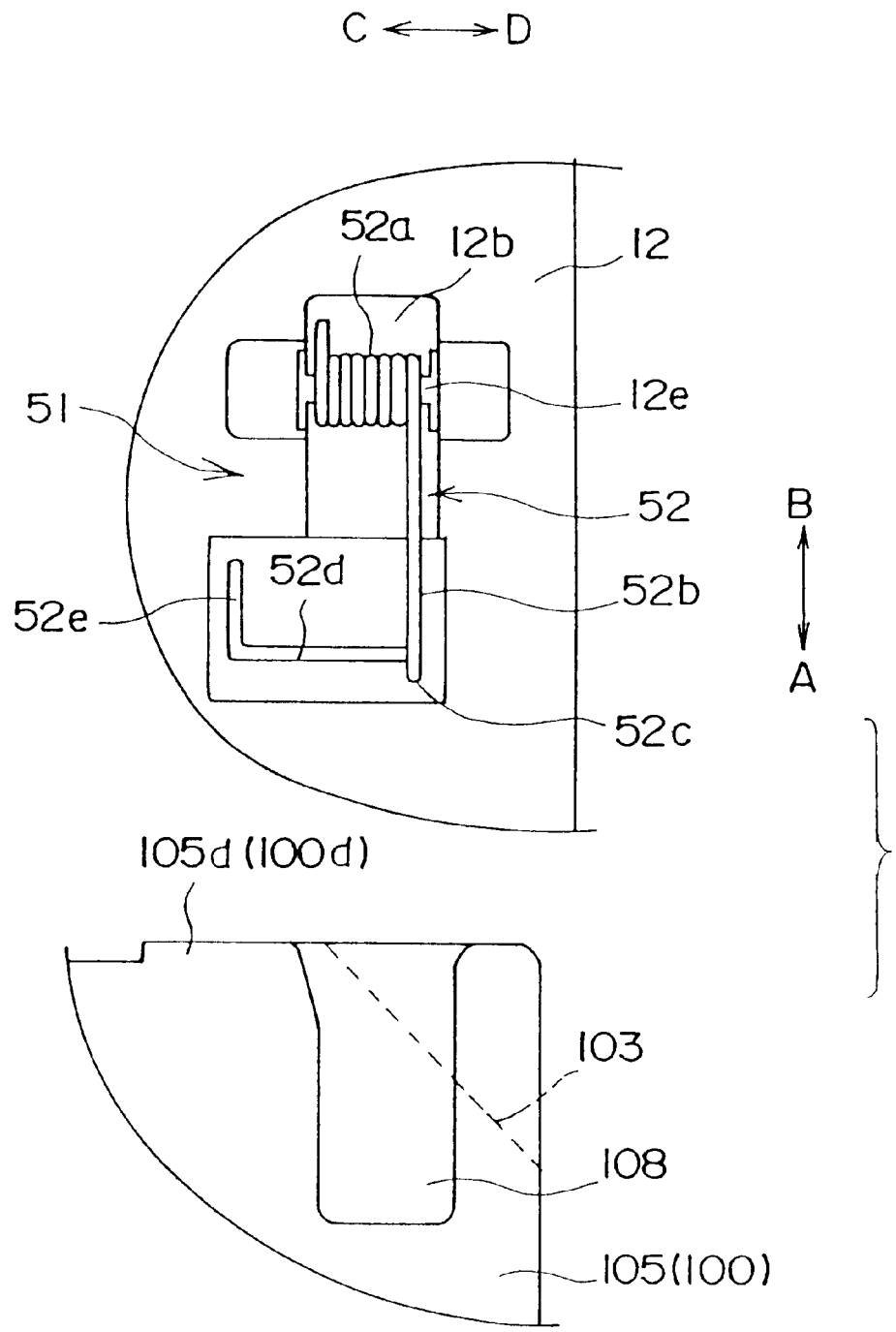
FIG. 16 shows a plan view of a second variant embodiment of the erroneous-insertion preventing mechanism.
Figure 17:
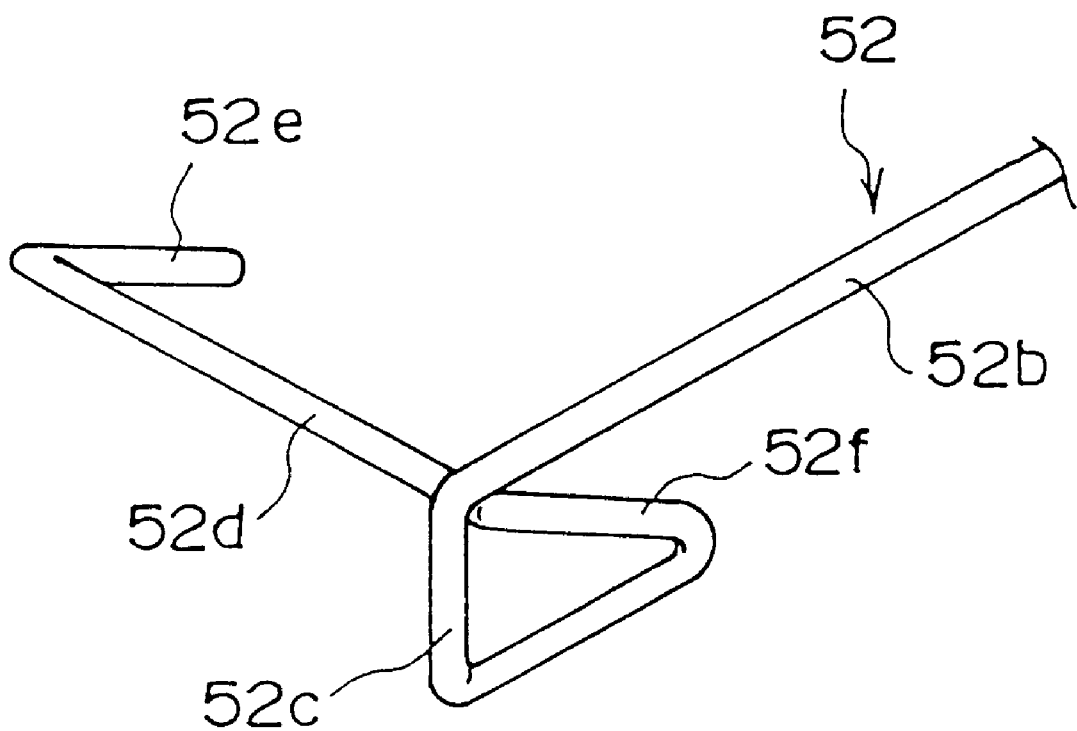
FIG. 17 shows a magnified perspective view of a portion of a spring member of the second variant embodiment shown in FIG. 16.

FIG. 16 shows a plan view for illustrating an erroneous-insertion preventing mechanism in a second variant embodiment of the present invention. FIG. 17 shows a magnified perspective view of a spring member of the second variant embodiment.

As shown in FIGS. 16 and 17, the erroneous-insertion preventing mechanism 51 includes only the spring member 52 provided in the opening 12b of the top plate of the disk holder 12. Thus, because, in the erroneous-insertion preventing mechanism 51, erroneous insertion of the disk cartridge 100 or 105 can be prevented by the spring member 52 obtained as a result of a wire being bent, the arrangement of the mechanism is further simplified and the number of components is further reduced.

The spring member 52 includes a coil portion 52a which is wound around a supporting portion 12e formed on the top plate of the disk holder 12, a first arm portion 52b extending normal, that is, in the direction A, from the coil portion 52a, a fitting portion 52c obtained as a result of an extending end portion of the first arm portion 52b being bent downward, a second arm portion 52d extending laterally (in the direction C) from the fitting portion 52c, and a contacting portion 52e obtained as a result of an extending end portion of the second arm portion 52d being bent in the inserting direction (in the direction B).

At the rear side of the fitting portion 52c, a reinforcement portion 52f bent to have a V shape is provided. In order to strengthen the fitting portion 52c when the insertion-side end 100d or 105d of the disk cartridge 100 or 105 comes into contact with the fitting portion 52c, the reinforcement portion 52f comes into contact with the rear surface of the fitting portion 52c and supports the fitting portion 52c so as to prevent the fitting portion 52c from being deformed by the operation force F at the time of insertion.

The contacting portion 52e is bent to be inclined at approximately 45° with respect to the cartridge inserting direction (direction B).

Figure 18A:
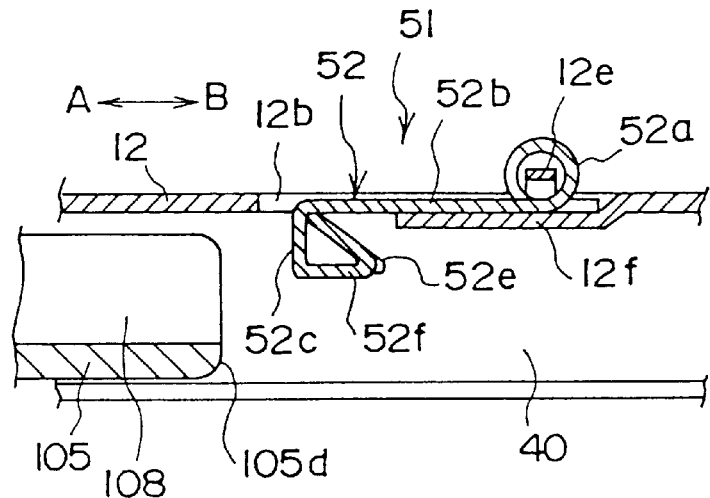
FIGS. 18A, 18B and 18C illustrate the operation of the second variant embodiment shown in FIG. 16 in a case where the disk cartridge is inserted in the correct orientation.
Figure 18B:
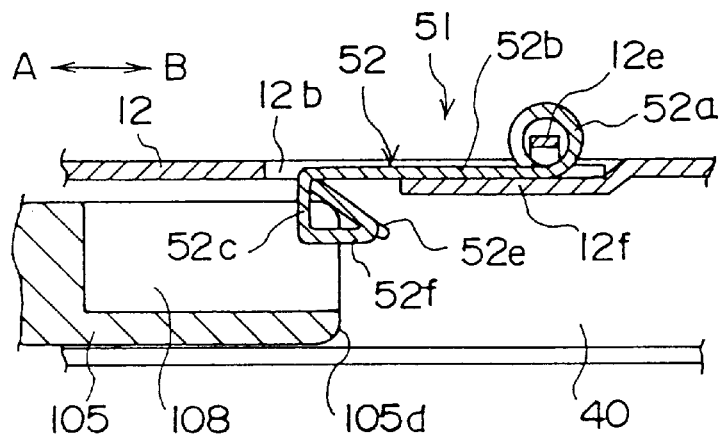
Figure 18C:
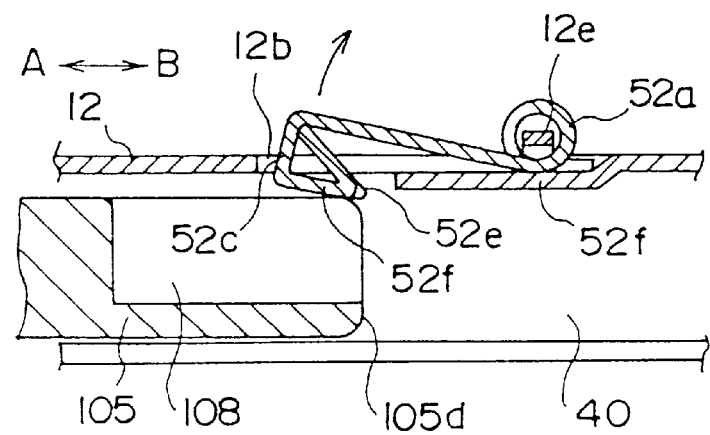

With reference to FIGS. 18A, 18B and 18C, an operation of the erroneous-insertion preventing mechanism 51 in a case where the disk cartridge 105 is inserted in the correct orientation will now be described.

The spring member 52 has a force applied thereto counterclockwise by the spring force of the coil portion 52a. Before the disk cartridge 105 is inserted, as shown in FIG. 18A, the first arm portion 52b of the spring member 52 comes into contact with the top plate 12f of the disk holder 12, and keeps a horizontal condition. At this time, because the fitting portion 52c is bent downward, the fitting portion 52c projects into the disk holder 12 from the opening 12b. Further, the contacting portion 52e also projects into the disk holder 12 from the opening 12b in a condition in which the contacting portion 52e is inclined at an angle of approximately 45°.

When the disk cartridge 105 is inserted in the correct orientation, the cut-off portion 108 of the disk cartridge 105 faces the fitting portion 52c of the spring member 52. Therefore, when the disk cartridge 105 is inserted with the operation force F, the fitting portion 52c of the spring member 52 is relatively fitted into the cut-off portion 108 approximately in the middle of the cartridge inserting path 40 in the disk holder 12.

As shown in FIG. 18B, as mentioned above, the fitting portion 52c of the spring member 52 is relatively fitted into the groove of the cut-off portion 108 in response to the insertion of the disk cartridge 105. As a result, the inclined contacting portion 52e is pushed by the insertion-side end 105d of the disk cartridge 105. Thereby, when the disk cartridge 105 is further inserted, the coil portion 52a of the spring member 52 is further wound, and also, the first arm portion 52b moves upward.

As shown in FIG. 18C, in response to the further insertion of the disk cartridge 105, the first arm portion 52b, the fitting portion 52c, and the contacting portion 52e rotate upward, and retreat from the cartridge inserting path 40. Thereby, the erroneous-insertion preventing mechanism 51 enters a condition in which insertion of the disk cartridge 105 is enabled. As a result, it is possible to insert the disk cartridge 105 to the last stage of the cartridge inserting path 40.

When the low-capacity cartridge 100 is inserted in the correct orientation, the contacting portion 52e slides on the insertion-side end 100d and the fitting portion 52c of the spring member 52 retreats upward. Thus, similar to the case of the high-capacity disk cartridge 105, when the low-capacity disk cartridge 100 is inserted in the correct orientation, the erroneous-insertion preventing mechanism 51 enables insertion of the low-capacity disk cartridge 100.

Further, when the disk cartridge 100 or 105 is inserted in the correct orientation, the first arm portion 52b of the spring member 52 has a force applied thereto so as to rotate counterclockwise by the spring force of the coil portion 52a, as shown in FIG. 18C. Thus, the contacting portion 52e provided at the projecting end of the first arm portion 52b pushes the top surface of the disk cartridge 100 or 105. Thereby, when the disk cartridge 100 or 105 is ejected, the pushing force of the spring member 52 acts as a load against the ejection operation. As a result, the speed of the ejection operation is decreased. Thus, at the time of the ejection operation, due to the pushing force of the spring member 52, flying out of the disk cartridge 100 or 105 from the disk inserting hole 26 is prevented.

Next, with reference to FIGS. 19A and 19B, an operation of the erroneous-insertion preventing mechanism 51 in a case where the high-capacity disk cartridge 105 is inserted in an erroneous orientation will now be described.

Figure 19A:
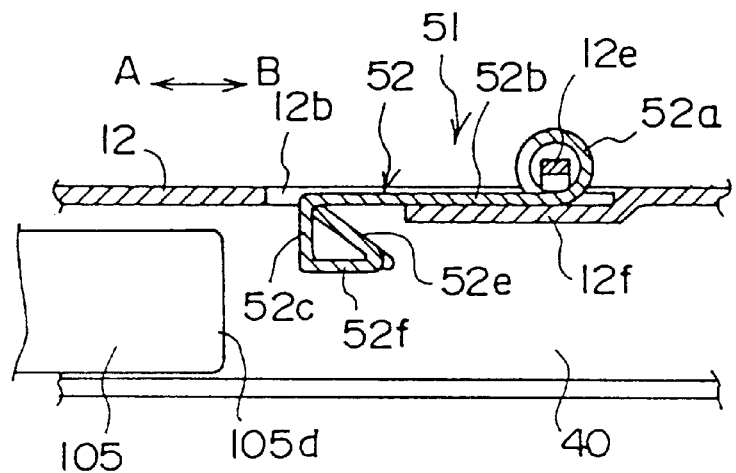
FIGS. 19A and 19B illustrate the operation of the second variant embodiment shown in FIG. 16 in a case where the disk cartridge is inserted in an erroneous orientation.

As shown in FIG. 19A, when the disk cartridge 105 is inserted in an erroneous orientation, the cutoff portion 108 of the disk cartridge 105 does not face the fitting portion 52c of the spring member 52, and the insertion-side end 105d of the disk cartridge 105 faces the fitting portion 52c of the spring member 52 extending vertically downward.

Figure 19B:
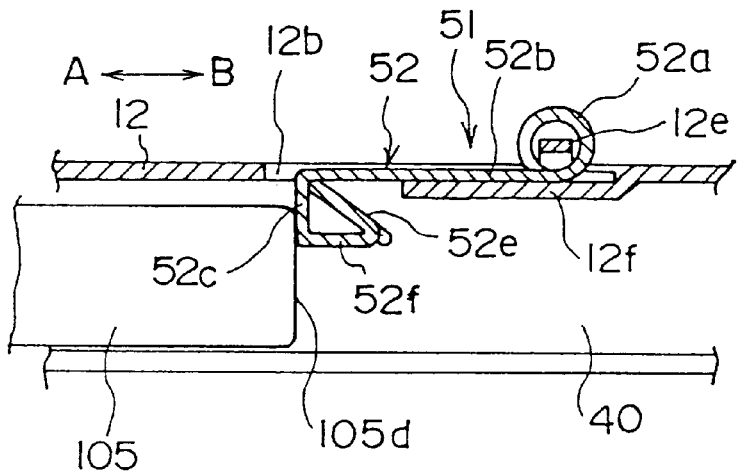

As shown in FIG. 19B, in response to insertion of the disk cartridge 105 in an erroneous orientation, the fitting portion 52c of the spring member 52 comes into contact with the insertion-side end 105d of the disk cartridge 105.

Thus, the fitting portion 52c of the spring member 52 comes into contact with the insertion-side end 105d of the disk cartridge 105, and the first arm portion 52b of the spring member 52 enters a condition in which the first arm portion 52b cannot move upward, and thus, enters an erroneous-insertion preventing condition in which insertion of the disk cartridge 105 is prevented. Thereby, erroneous insertion of the disk cartridge 105 is prevented approximately in the middle of the cartridge inserting path 40, and it is not possible to further insert the disk cartridge 105 into the disk holder 12.

Thus, when the disk cartridge 105 is inserted in an erroneous orientation, force is not applied to wind the coil portion 52a of the spring member 52, and the arm portion 52b is locked into a rotation-impossible condition. Thereby, in the cartridge inserting path 40 in the disk holder 12, insertion of the disk cartridge 105 in an erroneous orientation is prevented.

Therefore, because insertion of the disk cartridge 105 into the disk holder 12 is prevented approximately in the middle of the cartridge inserting path 40, an operator determines that the orientation of the disk cartridge 105 has been erroneous. Thus, in the erroneous-insertion preventing mechanism 51, it is possible to detect an erroneous insertion approximately in the middle of the cartridge inserting path 40 before the disk cartridge 105 is inserted to the last stage into the disk holder 12. As a result, it is possible to easily perform insertion of the disk cartridge 105 afresh in the correct orientation.

Further, the erroneous-insertion preventing mechanism 51 prevents insertion when the low-capacity disk cartridge 100 is erroneously inserted, similar to the case of the high-capacity disk cartridge 105.

Figure 20:
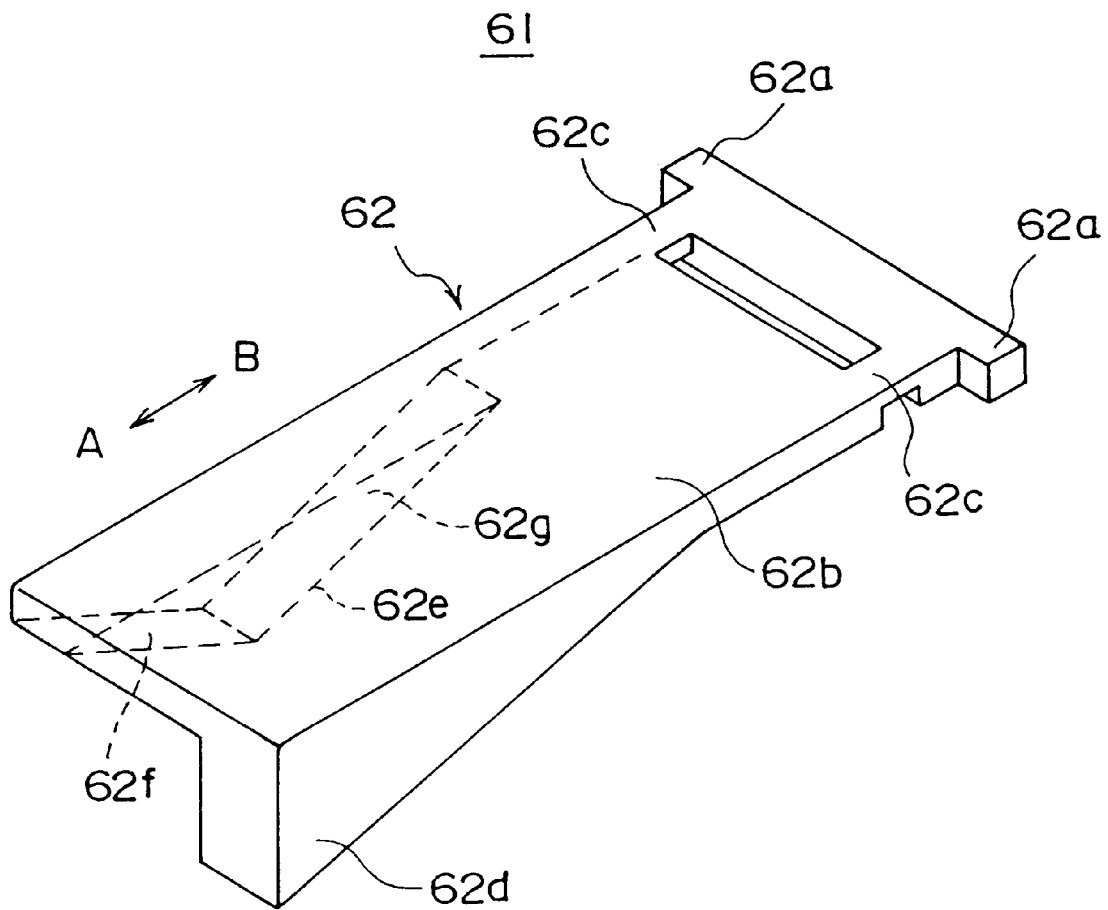
FIG. 20 shows a perspective view of a third variant embodiment of the erroneous-insertion preventing mechanism.

FIG. 20 shows a perspective view for illustrating an erroneous-insertion preventing mechanism in a third variant embodiment of the present invention.

As shown in FIG. 20, the erroneous-insertion preventing mechanism 61 includes a lever member 62 integrally molded out of synthetic resin, instead of the spring member 52.

The lever member 62 includes supporting portions 62a which are supported on the top plate of the disk holder 12, a plane portion 62b which extends horizontally from the supporting portions 62a, elastic deformation portions 62c which elastically deformably connects the supporting portions 62a and the plane portion 62b, a fitting portion 62d which projects downward from the right side of the bottom surface of the plane portion 62b, and a contacting portion 62e which projects downward from the left side of the bottom surface of the plane portion 62b.

The contacting portion 62e has an inclined surface 62f at an angle of approximately 45° with respect to the cartridge inserting direction (direction B), and an inclined surface 62g at an angle of approximately 45° with respect to the reverse direction (direction A).

Thus, because the erroneous-insertion preventing mechanism 61 includes only the lever member 62 integrally molded out of synthetic resin, the arrangement of the mechanism is further simplified and the number of components is further reduced.

When the disk cartridge 105 is inserted in the correct orientation, the cut-off portion 108 of the disk cartridge 105 faces the fitting portion 62d of the lever member 62. Thereby, in response to insertion of the disk cartridge 105, as a result of the fitting portion 62d of the lever member 62 being relatively fitted into the groove of the cut-off portion 108, the inclined surface 62f of the contacting portion 62e is pushed by the insertion-side end 105d of the disk cartridge 105.

When the disk cartridge 105 is further inserted, the lever member 62 moves upward as a result of the elastic deformation portions 62c being elastically deformed. Thus, when the disk cartridge 105 is inserted, the lever member 62 moves upward and the fitting portion 62d and the contacting portion 62e retreat from the cartridge inserting path 40, and thereby, further insertion of the disk cartridge 105 is enabled.

Further, when the disk cartridge 100 or 105 is inserted in the correct orientation, the fitting portion 62d and the contacting portion 62e of the lever member 62 have a force applied thereto so as to rotate counterclockwise by the elastic restoration force of the elastic deformation portions 62c. Thus, the contacting portion 62e pushes the top surface of the disk cartridge 100 or 105. Thereby, when the disk cartridge 100 or 105 is ejected, the pushing force of the lever member 62 acts as a load against the ejection operation. As a result, the speed of the ejection operation is decreased. Thus, at the time of the ejection operation, due to the pushing force of the lever member 62, flying out of the disk cartridge 100 or 105 from the disk inserting hole 26 is prevented.

When the disk cartridge 105 is inserted in an erroneous orientation, the cut-off portion 108 of the disk cartridge 105 does not face the fitting portion 62d of the lever member 62, but the insertion-side end 105d of the disk cartridge 105 faces the fitting portion 62d of the lever member 62 extending vertically downward.

In response to insertion of the disk cartridge 105 in an erroneous orientation, the fitting portion 62d of the lever member 62 comes into contact with the insertion-side end 105d of the disk cartridge 105. Thus, the fitting portion 62d comes into contact with the insertion-side end 105d of the disk cartridge 105, and the lever member 62 enters a condition in which the lever member cannot move upward, and, thus, enters an erroneous-insertion preventing condition in which insertion of the disk cartridge 105 is prevented.

Although the above-described embodiments are embodiments of the magnetic disk devices, it is not necessary to be limited to such applications. The present invention can be also applied to, for example, an optical disk device, a magneto-optic disk device, a loading device in which a card-shaped recording medium such as a memory card is loaded, and so forth.

Further, the present invention is not limited to the above-described embodiments, and variations and modifications may be made without departing from the scope of the present invention.

The contents of the basic Japanese Patent Application No.9-300543, filed on Oct. 31, 1997, are hereby incorporated by reference.

What is claimed is:

1. A recording-medium cartridge loading device comprising:
   a cartridge-inserting path through which a recording-medium cartridge containing a recording medium and having a cut-out portion at an inserting-direction front portion thereof can be inserted; and
   an erroneous-insertion preventing mechanism, wherein said erroneous-insertion preventing mechanism comprises:
      a fit-in portion which is arranged in said cartridge inserting path, and can move between a first position at which said fit-in portion is fitted into the cut-out portion of the recording medium cartridge inserted in a correct orientation and a second position outside of said cartridge-inserting path; and
      a contact portion which is arranged in said cartridge-inserting path, and can move between a first position which is a position at which said contact portion comes into contact with the front end of the recording-medium cartridge inserted and also is a position for causing said fit-in portion to be at said first position, and a second position which is a position outside of said cartridge-inserting path and a position for causing said fit-in portion to be at said second position, and
   wherein
      when the recording-medium cartridge is inserted in an erroneous orientation, said fit-in portion comes into contact with the insertion-direction front end of said recording-medium cartridge when said recording-medium cartridge is inserted up to a first insertion position, so as to prevent said recording-medium cartridge from being inserted further than said first insertion position; and
      when the recording-medium cartridge is inserted in the correct orientation, said fit-in portion at said first position is fitted into the cut-out portion, and, thereby, said recording-medium cartridge is inserted up to a second insertion position further than said first insertion position, and, at this time, said contact portion is pushed by the front end of said recording medium cartridge moving from said first insertion position to said second insertion position, so as to move from said first position to said second position, and said fit-in portion moves from said first position to said second position so as to enable said recording medium cartridge to be further inserted.

2. The recording-medium cartridge loading device as claimed in claim 1, wherein said erroneous-insertion preventing mechanism further comprises a force-applying portion which applies a force to said fit-in portion in a first direction.

3. The recording-medium cartridge loading device as claimed in claim 1, wherein said erroneous-insertion preventing mechanism further comprises a force-applying portion which applies a force to said contact portion in a first direction.

4. The recording-medium cartridge loading device as claimed in claim 1, wherein:
   the recording medium is a disklike recording medium; and
   said fit-in portion of said erroneous-insertion preventing mechanism moves from said first position to said second position in a direction perpendicular to the plane of said disklike recording medium.

5. A recording-medium cartridge loading device comprising:
- a cartridge-inserting path through which a recording-medium cartridge containing a recording medium and having a cut-out portion at an inserting-direction front portion thereof can be inserted; and
- an erroneous-insertion preventing mechanism, wherein said erroneous-insertion preventing mechanism comprises:
    - a fit-in member which is arranged in said cartridge-inserting path, and can move between a first position at which said fit-in member is fitted into the cut-out portion of the recording-medium cartridge inserted in a normal orientation and a second position outside of said cartridge-inserting path; and
    - a contact member arranged in said cartridge inserting path, having a first contact portion which can come into contact with the front end of the recording-medium cartridge inserted and a second contact portion which can come into contact with said fit-in member,
- said contact member being able to move between a lock position at which said first contact portion can come into contact with the front end of the recording-medium cartridge inserted in the normal orientation and at which said second contact portion comes into contact with said fit-in member so as to prevent said fit-in member from moving from the first position to second position, and an unlock position outside of said cartridge inserting path such that said fit-in member can move from the first position to second position,
- wherein:
    - when the recording-medium cartridge is inserted in an erroneous orientation, said contact member at the lock position locks said fit-in member at the first position and also said fit-in member locked at the first position comes into contact with the insertion-direction front end of said recording-medium cartridge when said recording-medium cartridge is inserted up to a first insertion position, so that said recording-medium cartridge is prevented from being inserted further than the first insertion position, and
    - when the recording-medium cartridge is inserted in the normal orientation, said fit-in member at the first position is fitted into the cut-out portion, and, thereby, said recording-medium cartridge is inserted up to a second insertion position further than the first insertion position, and, at this time, as a result of said first contact portion being pushed by the front end of said recording-medium cartridge moving from the first insertion position to the second insertion position, said contact member moves from the lock position to the unlock position, and said fit-in portion moves from the first position to second position so as to enable said recording-medium cartridge to be further inserted.

6. The recording-medium cartridge loading device as claimed in claim 5, wherein said erroneous-insertion preventing mechanism further comprises a force-applying portion which applies a force to said fit-in member in a first direction.

7. The recording-medium cartridge loading device as claimed in claim 5, wherein said erroneous-insertion preventing mechanism further comprises a force-applying portion which applies a force to said contact member in a first direction.

8. The recording-medium cartridge loading device as claimed in claim 5, wherein:
the recording medium is a disklike recording medium; and
said fit-in member of said erroneous-insertion preventing mechanism moves from the first position to second position in a direction perpendicular to the plane of said disk-like recording medium,.

9. The recording-medium cartridge loading device as claimed in claim 5, wherein;
the recording medium is a disklike recording medium; and
said contact member of said erroneous-insertion preventing mechanism moves from the first position to second position in a direction perpendicular to the plane of said disk-like recording medium.

10. A recording-medium cartridge loading device comprising
- a cartridge-inserting path through which a recording-medium cartridge containing a recording medium and having a cut-out portion at an inserting-direction front portion thereof can be inserted; and
- an erroneous-insertion preventing mechanism,
- wherein said erroneous-insertion preventing mechanism comprises an erroneous-insertion preventing member having a fit-in portion and a contact portion formed integrally therein,
- said fit-in portion being fitted into the cut-out portion of the recording-medium cartridge inserted in a normal orientation,
- said contact portion coming into contact with the front end of the recording-medium cartridge inserted, and
- said erroneous-insertion preventing member being able to move between a first position at which said fit-in portion and contact portion are in said cartridge-inserting path and a second position at which said fit-in portion and contact portion are out of said cartridge inserting path, and
- wherein:
    - when the recording-medium cartridge is inserted in an erroneous orientation, said fit-in portion of said erroneous insertion preventing member at the first position comes into contact with the insertion-direction front end of said recording medium cartridge when said recording-medium cartridge is inserted up to a first insertion position, so as to prevent said recording-medium cartridge from being inserted further than the first insertion position; and
    - when the recording-medium cartridge is inserted in the normal orientation, said fit-in portion of said erroneous insertion preventing member at the first position is fitted into the cut-out portion, and, thereby, said recording-medium cartridge is inserted up to a second insertion position further than the first insertion position, and, at this time, as a result of said contact portion of said erroneous-insertion preventing member at the first position being pushed by the font end of said recording-medium cartridge moving from the first insertion position to the second insertion position, said erroneous-insertion preventing member moves from the first position to the second position, and said fit-in portion and contact portion move out of said cartridge-inserting path so as to enable said recording-medium cartridge to be further inserted.

11. The recording-medium cartridge loading device as claimed in claim 10, wherein said erroneous-insertion preventing mechanism further comprises a force-applying portion which applies a force to said erroneous-insertion preventing member in a first direction.

12. The recording-medium cartridge loading device as claimed in claim 10, wherein said erroneous-insertion preventing member has an elastically deformation portion, which is deformed elastically, formed integrally therein, a force being applied to said erroneous-insertion preventing member in a first direction by an elastic forth of said elastically deformation portion.

13. The recording-medium cartridge loading device as claimed in claim 10, wherein:

the recording medium is a disklike recording medium, and said erroneous-insertion preventing mechanism is such that, as a result of said erroneous-insertion preventing member moving from the first position to second position, said fit in portion and contact portion move in a direction perpendicular to the plane of said disklike recording medium so as to move out of said cartridge-inserting path.

14. The recording-medium cartridge loading device as claimed in claim 12, wherein said erroneous insertion preventing mechanism is such that said erroneous insertion preventing member has said fit-in portion, contact portion and elastically deformation portion formed therein as a result of a wire being bent.

* * * * *